United States Patent [19]

Manukian et al.

[11] Patent Number: 5,276,771
[45] Date of Patent: Jan. 4, 1994

[54] RAPIDLY CONVERGING PROJECTIVE NEURAL NETWORK

[75] Inventors: Narbik Manukian, Glendale; Gregg D. Wilensky, Venice, both of Calif.

[73] Assignee: R & D Associates, Los Angeles, Calif.

[21] Appl. No.: 814,357

[22] Filed: Dec. 27, 1991

[51] Int. Cl.$^5$ .......................................... G06F 15/16
[52] U.S. Cl. .................................. 395/24; 395/11; 395/22; 395/25
[58] Field of Search ................... 395/11, 22, 24, 25

[56] References Cited

U.S. PATENT DOCUMENTS

| | | | |
|---|---|---|---|
| 3,097,349 | 7/1963 | Putzrath et al. | 340/172.5 |
| 3,158,840 | 11/1964 | Baskin | 340/172.5 |
| 3,209,328 | 9/1965 | Bonner | 340/146.3 |
| 3,230,351 | 1/1966 | Platt et al. | 235/151 |
| 3,275,986 | 9/1966 | Dunn et al. | 340/146.3 |
| 3,280,257 | 10/1966 | Orthuber et al. | 179/1 |
| 3,284,772 | 11/1966 | Stewart et al. | 340/146.3 |
| 3,284,780 | 11/1966 | Clapper | 340/172.5 |
| 3,310,783 | 3/1967 | Putzrath | 340/172.5 |
| 3,310,784 | 3/1967 | Hilinski | 340/172.5 |
| 3,311,895 | 3/1967 | Clapper | 340/172.5 |
| 3,317,900 | 5/1967 | Clapper | 340/172.5 |

(List continued on next page.)

OTHER PUBLICATIONS

Teuvo Kohonen, "Self-Organization and Associative Memory," (Berlin: Springer-Verlag 1984).
James A. Anderson and Edward Rosenfeld, Ed., "Neurocomputing Foundations of Research," (London: The MIT Press 1988).
Richard P. Lippman, "An Introduction to Computing with Neural Nets," *IEEE ASSP Magazine*, Apr. 1987, pp. 4–22.
Gail A. Carpenter, Stephen Grossberg, and David Rosen, Center for Adaptive Systems and Graduate Program in Cognitive & Neural Systems, Boston University, "ART 2-A: An Adaptive Resonance Algorithm for Rapid Category Learning and Recognition," Published by *IEEE*, 1991.
Gail A. Carpenter, Stephen Grossberg, and David Rosen, Center for Adaptive Systems and Graduate Program in Cognitive & Neural Systems, Boston University, "Fuzzy Art: An Adaptive Resonance Algorithm for Rapid, Stable Classification of Analog Patterns," Published by *IEEE*, 1991.
Teuvo Kohonen, "Self-organized Formation of Topologically Correct Feature Maps," *Biological Cybernetics* 43: 59–69, Springer-Verlag 1982.
Teuvo Kohonen, "Correlation Matrix Memories," *IEEE Transactions on Computers* C-21: 353–359, 1972.
D. E. Rumelhardt, G. E. Hinton, and R. J. Williams, (List continued on next page.)

*Primary Examiner*—Michael R. Fleming
*Assistant Examiner*—Tarig R. Hafiz
*Attorney, Agent, or Firm*—Poms, Smith, Lande & Rose

[57] ABSTRACT

A data processing system and method for solving pattern classification problems and function-fitting problems includes a neural network in which N-dimensional input vectors are augmented with at least one element to form an N+j-dimensional projected input vector, whose magnitude is then preferably normalized to lie on the surface of a hypersphere. Weight vectors of at least a lowest intermediate layer of network nodes are preferably also constrained to lie on the N+j-dimensional surface.

To train the network, the system compares network output values with known goal vectors, and an error function (which depends on all weights and threshold values of the intermediate and output nodes) is then minimized. In order to decrease the network's learning time even further, the weight vectors for the intermediate nodes are initially preferably set equal to known prototypes for the various classes of input vectors. Furthermore, the invention also allows separation of the network into sub-networks, which are then trained individually and later recombined. The network is able to use both hyperspheres and hyperplanes to form decision boundaries, and, indeed, can converge to the one even if it initially assumes the other.

46 Claims, 13 Drawing Sheets

U.S. PATENT DOCUMENTS

| | | | |
|---|---|---|---|
| 3,317,901 | 5/1967 | Clapper | 340/172.5 |
| 3,324,457 | 6/1967 | Ogle et al. | 340/172.5 |
| 3,325,787 | 6/1967 | Angell et al. | 340/172.5 |
| 3,333,248 | 7/1967 | Greenberg et al. | 340/172.5 |
| 3,333,249 | 7/1967 | Clapper | 340/172.5 |
| 3,351,783 | 11/1967 | Harris et al. | 307/88.5 |
| 3,408,627 | 10/1968 | Kettler et al. | 340/172.5 |
| 3,435,422 | 3/1969 | Gerhardt et al. | 340/172.5 |
| 3,440,617 | 4/1969 | Lesti | 340/172.5 |
| 3,533,072 | 10/1970 | Clapper | 340/172.5 |
| 3,548,202 | 12/1970 | Ide et al. | 307/201 |
| 3,602,888 | 8/1971 | Nishiyama et al. | 340/172.5 |
| 3,701,974 | 10/1972 | Russell | 340/172.5 |
| 4,163,983 | 8/1979 | Cline et al. | 357/12 |
| 4,254,474 | 3/1981 | Cooper et al. | 364/900 |
| 4,326,259 | 4/1982 | Cooper et al. | 364/715 |
| 4,450,530 | 5/1984 | Llinas et al. | 364/513 |
| 4,518,866 | 5/1985 | Clymer | 307/201 |
| 4,719,591 | 1/1988 | Hopfield et al. | 364/807 |
| 4,730,259 | 3/1988 | Gallant | 364/513 |
| 4,731,747 | 3/1988 | Denker | 364/807 |
| 4,737,929 | 4/1988 | Denker | 364/807 |
| 4,752,906 | 6/1988 | Kleinfeld | 364/807 |
| 4,760,437 | 7/1988 | Denker et al. | 357/30 |
| 4,760,604 | 7/1988 | Cooper et al. | 382/15 |
| 4,766,568 | 8/1988 | McGregor et al. | 365/49 |
| 4,774,677 | 9/1988 | Buckley | 364/513 |
| 4,796,199 | 1/1989 | Hammerstrom et al. | 364/513 |
| 4,800,519 | 1/1989 | Grinberg et al. | 364/822 |
| 4,803,736 | 2/1989 | Grossberg et al. | 382/22 |
| 4,805,225 | 2/1989 | Clark | 382/15 |
| 4,807,168 | 2/1989 | Moopenn et al. | 364/602 |
| 4,979,126 | 12/1990 | Pao et al. | 395/24 |
| 5,014,219 | 5/1991 | White | 395/11 |
| 5,105,468 | 4/1992 | Guyon et al. | 395/22 |
| 5,121,231 | 6/1992 | Jenkins et al. | 395/25 |
| 5,132,811 | 7/1992 | Iwaki et al. | 395/25 |
| 5,170,463 | 12/1992 | Fujimoto et al. | 395/24 |
| 5,179,596 | 1/1993 | Weingard | 395/25 |

OTHER PUBLICATIONS

"Learning Internal Representations By Error Propagation," *Parallel Distributed Processing: Explorations in the Microstructures of Cognition,* vol. 1, D. E. Rumelhart and J. L. McClelland (Eds.) (Cambridge, Mass.: MIT Press 1986), pp. 318–362.

Douglas L. Reilly, Leon N. Cooper, and Charles Elbaum, "A Neural Model for Category Learning," *Biological Cybernetics* 45, 35–41, Springer-Verlag 1982.

Amir Sarajedini, Robert Hecht-Nielsen, University of California, San Diego, "The Best of Both Worlds: Casasent Networks Integrate Multilayer Perceptrons and Radial Basis Functions." Paper submitted for publication to IJCNN, 1992, Baltimore.

James Saffery and Chris Thornton, Department of Artifical Intelligence, Edinburgh, "Using Stereographic Projection as a Preprocessing Technique for Upstart," published by *IEEE,* Jan. 15, 1991.

Brian Telfer and David Casasent, Center for Excellence in Optical Data Processing, Carnegie Mellon University, "Minimum-Cost Ho-Kashyap Associative Processor for Piecewise-Hyperspherical Classification," published by *IEEE,* 1991.

FIG. 16a PRIOR ART
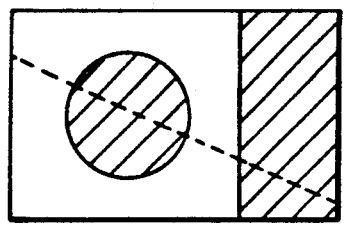
FIG. 16d
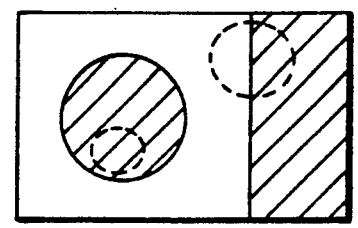
FIG. 16b PRIOR ART
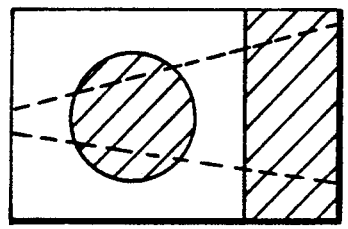
FIG 16e
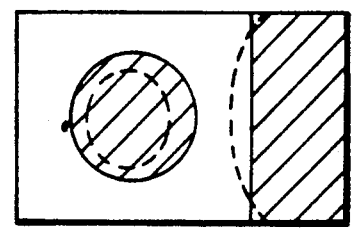
FIG. 16c PRIOR ART
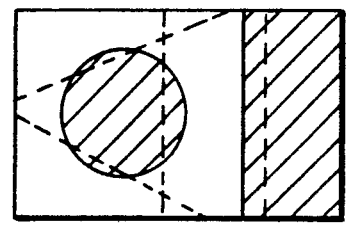
FIG. 16f
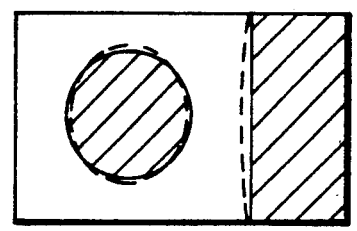
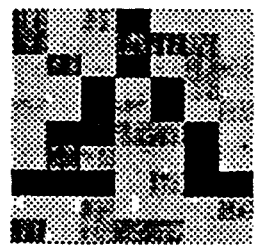
"A"    "B"    "C"
FIG. 17

RAPIDLY CONVERGING PROJECTIVE NEURAL NETWORK

TECHNICAL FIELD

This invention relates to a system and a method for a neural network in which the number of elements representing an input pattern or function is deliberately increased so that the input pattern or function is represented and evaluated as a projection onto a normalized space of higher dimension.

BACKGROUND OF THE INVENTION

A large class of problems, such as speech recognition, handwriting recognition, robotic control, function fitting and others, is difficult to solve or remain unsolved with conventional computing methods. They can, however, be cast in the form of pattern classification or optimization problems for which neural network methods have shown promise of solution.

A neural network is a type of computer or processor structure that resembles the structure of the human brain, in that data is processed in a multi-layered system of interconnected "nodes" or "neurons," each of which might be a set of memory cells or even a group of individual processors.

Conventional computers are programmed in a more or less completely non-adaptive manner, so that their ability to recognize patterns or a common structure in a data input stream is exclusively dependent on how expansive, detailed, and predictive its program is. In contrast, a neural network begins with interconnected nodes with biases, and it develops its own program through "training." Training normally involves presenting the network with a large number of training patterns with known values. The network's output is evaluated, and "mistakes" cause the network to adjust its internal parameters and interconnections in order to improve its performance. In other words, the network "learns," and its performance typically Will improve as it is "trained."

As an example, assume a neural network is to be trained to distinguish between digitized images representing the "A" and "B." In this case, the network has two outputs, namely, "A" and "B." When the network is presented with an image of an "A," it is to recognize this and activate the output "A." In order to train the network, a stream of "A" and "B" images is input to the network. For each input symbol, the network analyzes the input data and indicates whether it received an "A" or a "B." Every time the network decides that the input "A" is a "B," it is told that it has made a mistake, and it can then adjust the values of the neural connections and biases so that it will reduce the probability that it will make the same mistake again. In other words, a neural network uses a "feedback learning" procedure to adjust its internal evaluation parameters. Even for systems which only need to recognize well-defined or small input sets, known neural networks require long training times: very large numbers of training runs must be made before the network learns.

One of the foremost causes of long training times for existing neural networks is that the elements of the input set, that is, the group of different letters, entire words, sounds, pictures, symbols and other patterns or data, do not contain enough information about the proper values of the neural interconnections and biases to enable the network to make "good guesses." (This will be defined more precisely below.) In practice, this means that many neural networks are trained using random values for the interconnections and biases. Thousands of runs of thousands of different input symbols are not uncommon before conventional neural networks learn to recognize the input set with an acceptable degree of accuracy.

To make a human analogy, assume that a person is trying to learn German. If this beginner is presented with the words, "Stute," "Hengst," "Fohlen" and "Pferd," without further knowledge, she will have to analyze and look up each word one at a time and it will take a long time and many mistakes before she will have mastered them. The learning process, however, would be speeded up greatly if she were to know in advance that all these words refer to horses (i.e., "mare," "stallion," "foal," and "horse," respectively). When she later is confronted with the word "Wallach," if she is told that this word belongs to the same or to a very similar class of words (it means "gelding"), she will not make a large number of "wild guesses" before learning the new word. By "bounding" the input class, the learning process is much quicker.

One of the other major disadvantages of long learning times for neural networks is that it makes it more difficult or impossible for them to work in real time. If a slow-learning neural network encounters a symbol or pattern it does not recognize, there may not be enough time to retrain the network to incorporate the new symbol. Moreover, if it takes a neural network a long time to converge, that is, to decide which pattern it has before it, it may be too slow to be of practical use. A text recognition system that can only read two words per minute would be, of course, of limited usefulness in helping the blind to read books printed in, for example, type fonts which the neural networks have not previously encountered.

Furthermore, standard neural networks need more neurons and interconnections to learn more complicated problems. The requirements for memory and training time may therefore become prohibitive for very large-scale problems. Consequently, it is also important to make networks more efficient, that is, to use fewer nodes and interconnections. It is therefore a goal in the field of neural network design to increase the learning speed of the neural network, as well as to increase its accuracy.

Yet another shortcoming of existing networks is that when they are to recognize a new pattern (for example, a new type font) they haven't already been trained for, it is necessary to retrain them from scratch. Conventional networks are thus not "modular," in that they cannot establish proper weights and biases for new patterns separately from those already established for earlier training patterns.

Examples of developments in neural network research are found in "Neurocomputing Foundations of Research," edited by James A. Anderson and Edward Rosenfeld, "A Design For An Associative Spin Glass Processor," by James M. Goodwin, Bruce E. Rosen, and Jacques J. Vidal, and the associated U.S. Pat. No. 4,977,540, "Spin Glass Type Associative Processor System" (Goodwin, et al, Dec. 11, 1990), "Optical Neural Computers," by Yaser S. Abu-Mostafa and Demitri Psaltis, (*Scientific American,* March, 1987), U.S. Pat. No. 3,887,906, "Optical Associative Memory Using Complementary Magnetic Bubble Shift Registers" (Minnaja, Jun. 3, 1975), and "A Learning Algorithm for Boltzmann Machines," by David H. Ackley and Geoffrey E. Hinton (*Cognitive Science*, Vol. 9, pp. 147-169, 1985).

The object of this invention is to provide a neural network that requires a much shorter training time than existing neural networks, while maintaining the ability to find an optimal solution, to make a more efficient network, using fewer nodes and weights, and to make the network "modular," so that a new pattern can be learned without the need to retrain the network from scratch.

SUMMARY OF THE INVENTION

A data processing system includes an input device for representing each of a series of input data groups as a sequence of N numerical values to form and store a corresponding N-dimensional base input vector, and for storing each base input vector. The system includes a multi-layered neural network whose input layer is augmented by a processor to include at least N+j projected input memory units, where j is a predetermined positive integer, for storing a normalized projected input vector having N+j numerical elements. Each projected input vector corresponds to one of the base input vectors.

The processor according to the invention preferably also normalizes the N+j elements of the projected input vector, as well as of the N+j-dimensional weight vectors in a least a lowest intermediate layer.

To train the network, the invention also includes a comparison device comparing the network output value with predetermined goal vectors. The processor then recomputes intermediate threshold values and the intermediate weight vectors until the network output values differ by less than a predetermined minimum threshold amount from the corresponding goal vectors.

The invention can be used not only for pattern recognition and classification problems, but also for function-fitting problems.

The method also encompasses a method for training and operating the system, more specifically, the neural network. According to the invention, each N-dimensional input vector is augmented with at least one more element to form a projected input vector. In a preferred form of the method, this projected input vector is normalized to lie on the surface of a sphere.

The weight vectors associated with at least the first intermediate layer nodes of the neural network are preferably also constrained to lie on the surface of an N+j-dimensional hypersphere.

During training of the network, a sequence of known input vectors is fed to the network, which then computes an error function that depends on all the weight vectors and all the threshold values of the intermediate nodes (and, in a further embodiment, of the output nodes as well). The weights and thresholds are then adjusted using an optimization routine until an error value is less than a predefined minimum.

In order to decrease the network's learning time even further, the weight vectors for the intermediate nodes are preferably initially set equal to known prototypes for the various classes of input vectors. Furthermore, the invention also allows separation of the network into sub-networks, which are then trained individually and later recombined.

Deliberately increasing the complexity of the input vectors from dimension N to dimension at least N+j and normalizing both the weight vectors and the input vectors defines closed decision groups of possible output values using a single at least N+j dimensional boundary region for each decision group. Moreover, the network is able to use both hyperspheres and hyperplanes to form decision boundaries, and, indeed, can converge to the one even if it initially assumes the other.

BRIEF DESCRIPTION OF THE DRAWINGS

FIG. 3(*b*) illustrates qualitatively a typical sigmoid function that the network according to the invention uses to normalize error values;

FIG. 4(*b*) illustrates a "same dimensional" hypersphere classifier according to the prior art;

FIG. 12(*b*) shows an example of the neural network according to the invention in a function-fitting application;

FIGS. 16(*a*)-(*c*) and 16(*d*)-(*f*) illustrate the experimental results of a pattern recognition test using a conventional neural network (FIG. 16(*a*)) and using the network according to the invention (FIG. 16(*b*)); and FIG. 17 illustrates three examples of input patterns, with noise, used in another experimental test of the neural network according to the invention.

THEORETICAL BACKGROUND AND LIMITATIONS OF THE PRIOR ART

Figure 1:
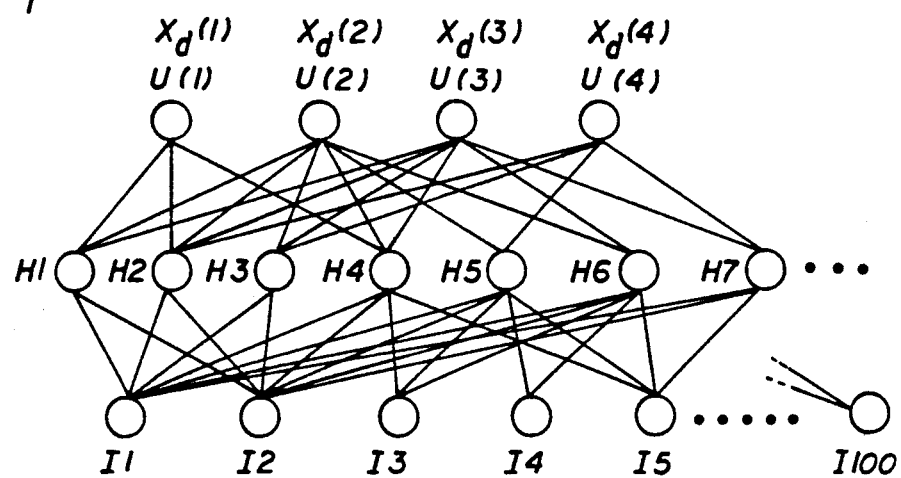
FIG. 1 shows an example of a generalized structure of a neural network.

FIG. 1 illustrates an example of a simple neural network. This network includes 100 input nodes I1-I100, four output nodes U1–U4, and an intermediate layer of "associated," "internal" or "hidden" nodes H1–H7. Connections between nodes in different layers are illustrated with solid lines.

Figure 2:
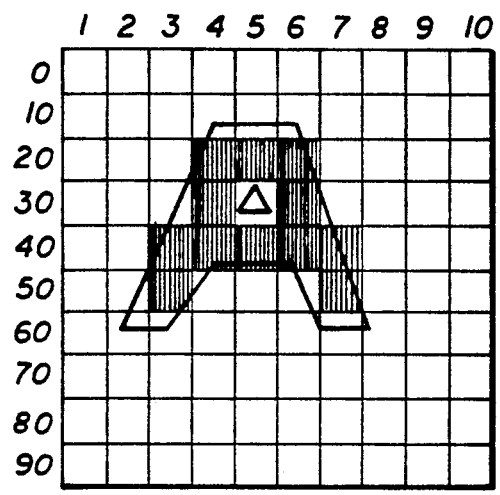
FIG. 2 illustrates the conversion of an input image pattern into a representative series of numerical values.

In order to understand the invention it is first necessary to understand the general structure of an "input vector," and to this end FIG. 2 shows an example that might occur in a simple system designed to recognize letters or words (such as a document reader). Assume the scanner of the document reader uses a 10×10 grid (numbered from 0 to 99) of light-sensitive elements that scan each line of a text. Assume further that each element is interpreted either as "black" (meaning that a square is more dark than light, according to some predetermined threshold) or "white" (more light than dark); in other words, assume this simple scanner does not see "grays."

If we arbitrarily assign the value "1" to "black" and the value "0" to "white," then the pattern seen in FIG. 2 can be represented by a string of 100 numbers in which grid elements 24–26, 34, 36, 43–47, 53 and 57 are "1's" and all the remaining elements are "0's." In more advanced systems, even gray tones may be recognized. In such case, instead of having just two possible values for each grid square, there may be many. For example, if the system recognizes sixteen different shades of gray (including one for white and one for black) each element of the 100-dimensional input vector would have a value, for example, from 0 to 15 (or from zero to one in sixteenths), and could be represented by four-bit data words.

Such digitization techniques are well known. These techniques are of course not limited to visual patterns. As an example of a common alternative one may consider the ubiquitous "compact disk" or "CD," for which sound (even complicated arrangements of orchestral music) is digitized, that is, analyzed into a series of numbers (represented in binary form as the equivalent of "1's" and "0's") that in turn are represented on the surface of the disk as a pattern of "holes" or "dents" made by a laser. The important point to keep in mind is that, in the illustrated example, as well as in other applications, the input pattern (the letter "A," a 1/1000 second interval of a Beethoven symphony, or whatever pattern is the input) is reduced to a string of N numbers. In the illustrated example, the numbers are 0 and 1, and $N=100$.

Referring to FIG. 1, assume that the letter "A" has been scanned, for example by a document reader, and reduced to an N-dimensional input vector $\bar{x}_i$ of numbers (not necessarily just binary digits). Each of the 100 elements (assuming $N=100$) of the input vector is input to a respective one of the input nodes I1–I100 of the network.

In neural networks, one wishes the output of the system to be as "close" to the desired output as possible; more specifically, if an "A" or the word "tree" or a picture of a dolphin is presented as inputs to a neural network being trained, one wants the networks output (that is, its decision as to which pattern it has analyzed), to be "A," "tree" or "dolphin." In existing neural networks, each hidden node is assigned a weight vector $w$ and a threshold value $v$. For each hidden node, the input vector $x$, the corresponding weight vector $w$ and the corresponding threshold value are combined mathematically to form intermediate values, one for each hidden node. The intermediate values are in turn combined to form output values $u$.

In the example shown in FIG. 1, there are four outputs, as would be the case when one only wishes to be able to identify or classify four input patterns (each of which consists of N elements). In general, there will be one output node for each class of input patterns one wishes to be able to identify. For example, u(i), u(2), u(3), and u(4) might correspond, respectively, to "A", "B", "C", and "D". In other words, if the values of the intermediate nodes H1, H2, . . . are such that only u(2)'s value exceeds a certain predetermined threshold, then the neural network signals a "B."

Training a conventional network involves presenting it with a large number of known input patterns and comparing the network's "answers" with the known, desired results. The deviation of actual results from desired results is normally expressed in terms of an "error function." The error is a function of the weight vectors $w$ and the threshold values $v$, which are adjusted for each test run of the training patterns. Ideally, the amount of error should be equal to zero, but in practice one seeks to minimize the error function using known optimization routines. These routines typically proceed in steps toward the optimum value.

Figure 3A:
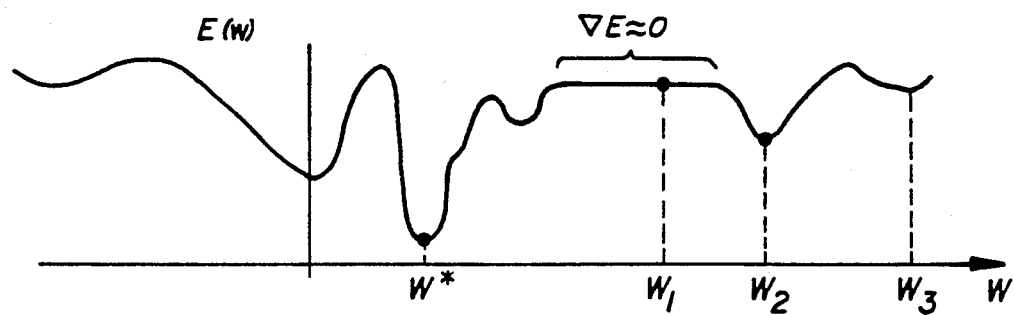
FIG. 3(*a*) illustrates qualitatively a typical error function that is used by the invention.

FIG. 3(a) illustrates a typical error function, in which the error E(w) is plotted qualitatively as a function of one weight w. Of course, in general, the error function depends on all the weights in all the weight vectors, as well as on all the threshold values $v$. For illustrative purposes, however, the error function E is shown as a function of only a single weight.

This example serves to illustrate two of the greatest weaknesses of existing neural networks. First, numerical optimization routines used to minimize the error function proceed in discrete steps toward an optimum solution. The most common optimization routines involve some version of the gradient descent method, in which the size of an optimization step and the direction in which the step is taken (keeping in mind that most error functions involve N-dimensional calculations, not simply 2-dimensional curve plot as in FIG. 3) depend on the size and direction of the gradient of the error function.

To clarify this statement, assume one is attempting to find one's way to the lowest point of a mountainous landscape, and that one wishes to reach this point as fast as possible. Assume further that one starts out on the side of a hill or mountain, and that the fog is so thick that one can only see 10 feet ahead. Without further information, one could look to find where, within 10 feet, the mountain slopes most steeply downhill, and one could then proceed in that direction. If the terrain is completely flat as far as one can see, then the slope gives no information about which direction is best, and any choice could just as well be random.

If the slope angle is not great, one takes a small step, since a small slope is not a strong indication that the terrain will continue to become lower in that direction. If, however, the slope angle is greater, one can assume that it is unlikely to slope back upward soon and that taking a large step in that direction will bring one down quickly.

The mountainous landscape analogy also illustrates the reason that the standard learning techniques of existing neural networks is so slow. If one happens to start out on a plateau in the landscape, such that the terrain is very flat in one's vicinity, then one will not take very large steps, and learning will be slow. Furthermore, even small, localized "valleys" may send one off in the wrong direction or trap one in an undesired area for a long time.

This is the well-known problem of "local extrema": if one starts too far from the lowest point of the landscape (the desired optimum point) and has only limited visibility and no information as to the height above sea level of the lowest point, then one may end up in a shallow depression and believe one has found the lowest point. It is therefore of great advantage to be able to start as close to the goal—the global extremum—as possible, since the possibility of being trapped in "false optimum points" or on a plateau is less likely the closer one gets to the optimum.

Consider now the error function E(w) illustrated in FIG. 3(a). In the region near $E(w_1)$, the error curve is very flat ($\nabla E(w_1) \approx 0$), and if the neural network begins its optimization attempts in this region (or, during training, ends up in this area), it will take a long time for the network to reach the optimum value.

FIG. 3(a) also illustrates the problem of local extrema. Assume that the neural network's training routine chooses the weight to be $w_2$, and that its step size (the distance it can "see" from where it is now) is less than the difference between $w_1$ and $w_2$. Now between $w_1$ and $w_3$, the error function E is least for the point $w_2$. This means that unless the training routine changes its step size, it will probably stop at $w_2$, since it will assume that any other point within reach Will lead to a greater value for E, that is, to a worse result. The training routine may never, or only after a long time and a change of step size, reach the true optimum point w*, where the error E is the least.

This is precisely the case for most known neural networks: since the input vectors used to train existing networks are commonly chosen at random, the initial error is relatively very great, and the error function often starts in a "plateau" or in an area where there is a local extremum. For this reason, very large numbers of training patterns and training runs (and correspondingly long training times) are necessary before existing neural networks reach optimal or even acceptable working values for their weight vectors and threshold values.

As FIG. 3(a) illustrates qualitatively, the error function $E(w,v)$ may have an arbitrary shape, with local minima and plateau regions.

Figure 3B:
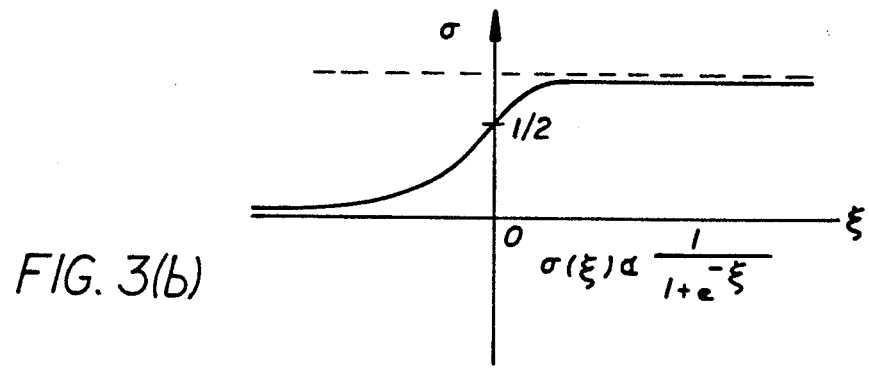

FIG. 3(b) illustrates a conversion function that interpolates the output of each higher layer node between known maximum and minimum values. Such a function, when used in conjunction with neural networks, is commonly known as a "sigmoid" function. For each value $\xi$, the sigmoid function takes the form:

$$\rho(\xi) \propto (1+e^{-\xi})^{-1}$$

The application of the sigmoid function in the neural network according to the invention is explained below.

A major contributing factor to the inefficiency that plagues existing neural networks during the training phase results from the rather natural assumption that if one has an N-dimensional input pattern, one should operate on it as it is, using weight vectors of the same length. In implementation, this also means that one minimizes memory usage, since for input nodes I1, I2, . . . , IN one uses only one unit of memory (bit, byte, word, array, etc.) for each element of the input vector, and only N units of memory for each N-dimensional weight vector.

Hyperplane Classifiers According to the Prior Art

Figure 4A:
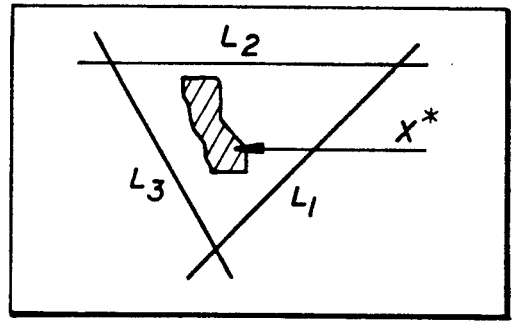
FIG. 4(*a*) illustrates a "same-dimensional" hyperplane classifier according to the prior art, that is, a neural network according to the prior art in which decision surfaces are hyperplanes of the same dimension as the space containing the vectors corresponding to the input patterns to be recognized.

FIG. 4(a) illustrates graphically a simple, 2-dimensional example of the "same-dimensional" evaluation procedure used in existing neural networks. For purposes of this illustration, assume that the neural network is to be able to decide whether a particular point lies inside or outside of California (the shaded area in the plane P*). All input vectors presented to the network are 2-dimensional, and thus lie in the base plane P*. (Referring back to FIG. 2, note that the input corresponding to the image of the letter A would be 100-dimensional and would be impossible to illustrate.) Suppose further that the input vectors in the shaded region belong to some class of inputs (points within California) that we wish to distinguish or separate from all other classes of inputs (such as, for example, points that lie in other states of the U.S.).

By choosing training vectors of the same dimension as the 2-dimensional input vector x*, the network is in effect selecting other lines L1, L2, L3, L4 (two-dimensional surfaces) that the optimization procedure moves around until they "box in" and "outline" the desired region, thus separating inputs that lie within the region from all other inputs. Training involves deciding how many lines are needed and how to move them around to achieve the best "fit."

It is at this point that another weakness of existing neural networks becomes more obvious. Most importantly, one should observe that in order to fully surround any region in two dimensions, one needs at least three lines (which then form a "triangular" closed region in the plane. In FIG. 4(a), a class of input vectors has the shape of the state of California. In order to enclose this shape on the plane, one would need at least three lines, which would form a "triangle" around the shape.

To get a better "fit," that is, to better enclose the region, one would need more lines, for example, one line along the northern border, one along the southern border, and one line running along each "long border" approximately in the direction northwest-southeast. This can become very inefficient, particularly for high-dimensional (large N) problems. Choosing the number of lines to use and "shifting" them around is a timeconsuming mathematical process, especially if one does not have a good first guess as to how the lines should be located.

Assume instead that one could simply identify a point somewhere in the shaded region in FIG. 4(a), and could then draw a single ellipse or circle with the point as a focus or center. Clearly, simply by making the ellipse or circle bigger (which can be done by adjusting only a single parameter such as the radius of the circle), one will eventually be able to enclose the entire shape, even though one is using only a single enclosing boundary (the edge of the ellipse or circle).

As is explained in more detail below, the method of training the neural network according to the invention uses just such a procedure: a vector is first placed within the known "target" region, and circular or elliptical regions are then generated until the shape is enclosed. Thus, according to the invention, one needs only a single boundary surface, as compared to N+1 surfaces (for example, three lines to enclose a two-dimensional region). Of course, this efficient method of delimiting regions is impossible using prior art hyperplane systems since, as FIG. 4(a) illustrates, these systems are limited to the use of lines to form closed decision regions.

In general, in order to form a closed region around a finite N-dimensional pattern, one needs at least N+1 hyperplanes (N>2; planes of greater dimension than two are commonly referred to as "hyperplanes"). FIG. 4(a) illustrates this principle for a 2-dimensional test pattern. To conceptualize the principle for a three dimensional case one can note that it would take at least four planes or "walls" to build a garage to enclose a 3-dimensional car (counting the floor plane as a wall). The "garage" in this case would have the general shape of a pyramid.

A further drawback of existing "same-dimensional" neural networks, especially the common networks that use random training weight vectors, is that it is difficult to guess the values of the weights and thresholds to enclose the desired region at the beginning of the training procedure. In this respect one must keep in mind that, in most cases, the plane P. will extend infinitely; one cannot even assume that the desired pattern lies in the section of the plane illustrated in FIG. 4(a). The great value of closed regions is that if one knows that the best solution must lie somewhere in a closed region, one need not waste time searching for the optimal result outside this region.

Same-Dimensional Hypersphere Classifiers According to the Prior Art

Other known classification systems provide faster training time than the hyperplane classifiers, but they are not designed to minimize the error. In effect, these methods allow a neural network to learn quickly, but not very well. Examples of these are the hypersphere classifiers, such as the Reduced Coulomb Energy (RCE), see D. L. Reilly, L. N. Cooper, C. Elbaum, "A Neural Model for Category Learning", 45 Biological Cybernetics, pp. 35–41, 1982, and the Kohonen type networks, see T. Kohonen, "Learning Vector Quantization for Pattern Recognition", Technical Report TKK-F-A601, Helsinki University of Technology, 1986.

Figure 4B:
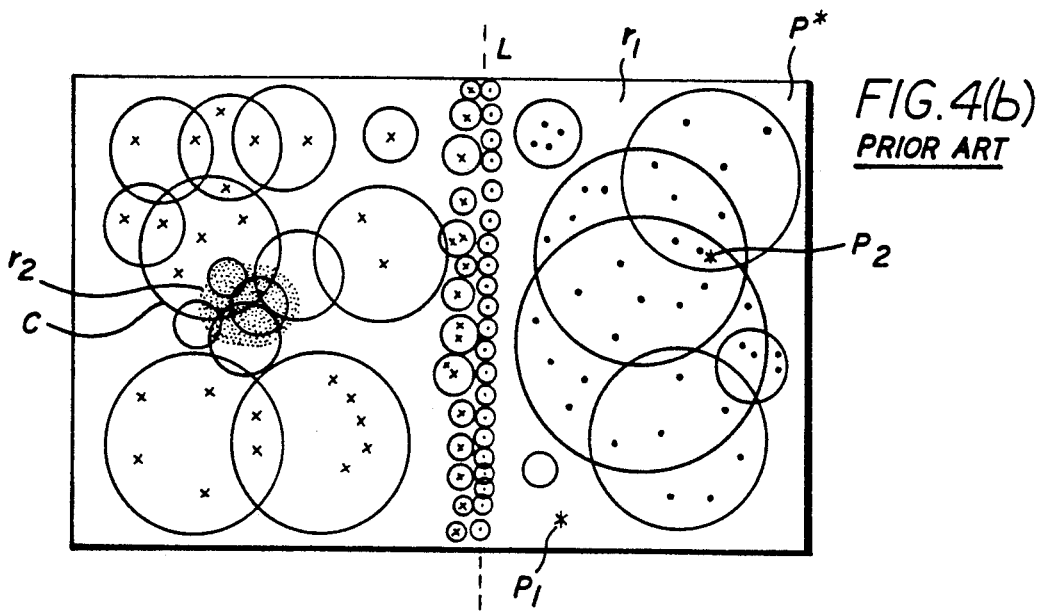

FIG. 4(b) illustrates the RCE method, as well as several of its disadvantages. Once again, assume for the sake of simplicity that the input space to be classified is two-dimensional. In the example, points in the input space belong to one of two classes: dots or "x's". The region $r_1$ to the right of the dividing line L contains only dots, and the region to the left of the line L contains only "x's", with the exception of the circular region $r_2$, which contains only dots. Each dot or "x" corresponds to a training vector, that is, a vector in a known class.

According to the conventional RCE training method, the network chooses a point, usually at random, in the input space P*. The RCE network then makes a big circle (a hypersphere of the same dimension as the input vectors) around this point and then shrinks the circle (reduces its radius) until points of only one class lie within the circle; the circle marked C in FIG. 4(b), for example, contains both dots and "x's", and so must be shrunk further. The RCE network continues to place points in the input space, surround them with circles, and then shrink the circles until each circle contains only one class of points. The network is considered "trained" when every "training point" (input training vector) is surrounded by at least one circle.

One problem with known hypersphere classifiers such as RCE is that much of the input space is either unclassified or is "double-classified." The point $p_1$, for example, is not contained within any hypersphere, whereas the point $p_2$ is inefficiently contained within three. If the trained RCE network were presented with an actual vector at $p_1$, it would not be able to classify it.

Another problem is that if any class boundaries are linear or sharp, it takes a large number of hyperspheres to approximate the boundary accurately. By way of example, consider the linear boundary L in FIG. 4(b). In order to define the boundary L exactly, one could theoretically use a circle of infinite radius, with its center infinitely far from the line L, so that its intersection with the plane section P* would be a line. First, this is not computationally feasible when the circle (hypersphere) is of the same dimension as the input vectors, since circles in a plane cannot be placed infinitely far away from a line when one doesn't even know in advance that the line exists. Second, starting all circles with an infinite radius greatly increases the training time, since they must be shrunk in stages from such a large value. Third, this is not possible according to existing methods such as the RCE method, however, since these networks never expand circles, they only shrink them.

Yet another shortcoming of hypersphere classifiers such as RCE is that, although they quickly form classification regions in the input space by placing hyperspherical prototypes around training data points and adjusting their radii, they provide only a binary output for each class: the network only determines whether it thinks a point is "inside" or "outside," with no indication of how probable it is that this determination is correct. The RCE networks do not provide classification probabilities. Certain techniques have been proposed to provide some information about probability in RCE networks, but since this is not an error minimization technique, the solutions are not guaranteed to be optimal.

An alternative way of approximating linear boundaries is to use a very large number of very small circles that are aligned along the boundary. This is shown in FIG. 4(b), and this is also the typical method used in conventional hypersphere classifiers. The obvious drawback of this method is that, even for a simple two-dimensional line L, scores or even hundreds of small circles (hypersphere classifiers) are needed to get a reasonably sharp class boundary; each such circle represents additional training time and network complexity (each requires a separate hidden or intermediate node). Another drawback is that such small circles leave too much space uncovered.

According to the Kohonen method, the network normalizes all N-dimensional input vectors so that they lie on an N-dimensional sphere. It then picks prototype input vectors on the sphere, which it then moves toward clusters of points on the sphere, which represent classes. A serious problem with this method is that such "same-dimensional" normalization causes all information about the relative magnitudes of the input vectors to be lost. Another problem is that, as is also the case with hypersphere classifiers such as RCE, Kohonen networks are unable to make good initial guesses, and thus unnecessarily lengthen training time.

DETAILED DESCRIPTION OF THE INVENTION

The neural network according to the invention, as well as its unique and rapidly converging training method, will now be described. To start with, a neural network for solving pattern recognition problems is described. The invention is, however, in no way limited to pattern recognition problems. As an example of alternative applications, a network is described later for use in solving "function fitting" problems, such as would typically occur when the neural network is to be used in an autopilot, in controlling the movements of a robotic arm, etc.

The Method of Protection According to the Invention

As is discussed above, existing neural networks evaluate N-dimensional input vectors or patterns using N-dimensional weighing vectors and input nodes. The neural network according to the invention, however, utilizes a counter-intuitive procedure: the network deliberately increases the dimension of the input and weight vectors by one in order to evaluate N-dimensional input patterns in N+1-dimensional space. In other words, the network according to the invention "projects" the pattern recognition problem into a higher-dimensional space. Using the network structure and evaluation procedure according to the invention, experiments have demonstrated that training times may be greatly reduced—in many cases by orders of magnitude—compared with known neural networks.

Figure 5:
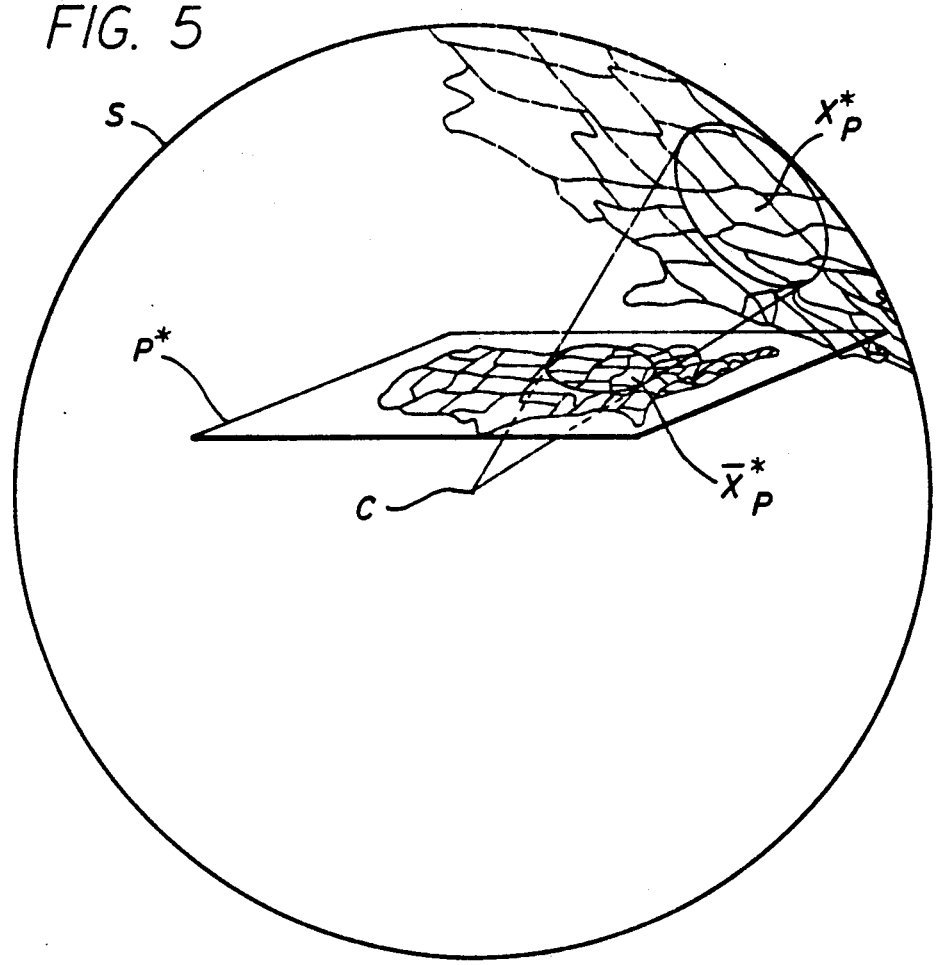
FIG. 5 is a simplified geometrical illustration of the method of projection to higher dimensional space employed in the neural network according to the invention.

FIG. 5 is a simplified graphical illustration for a two-dimensional case (N=2) of the method of projection according to the invention. Merely for the sake of clarity and simplicity, the input vectors or regions in this example are all 2-dimensional (N=2), lying in the base plane P*. Furthermore, in the following description, vector quantities are indicated by overscoring; thus, $\bar{x}$ is the vector x. In the example shown, one wishes the neural network to be able to distinguish input vectors, corresponding to points in the plane P*, that fall in state of Iowa, from all other input vectors. Vectors on the plane P* are indicated by $\bar{x}_b{}^*$.

The network according to the invention first projects the N-dimensional input vectors $\bar{x}_b{}^*$ onto a closed surface of dimension N+1. In the illustrated example, the planar (N=2) input regions are projected onto the surface of an enclosing sphere S (N=3, since a sphere is 3-dimensional). In order to understand this projection one can imagine that the base plane P* is an infinitely thin sheet of glass placed inside a sphere, and that a light shines from the center C of the sphere S. The borders of the various states will then be outlined, albeit in a somewhat distorted or warped form, on the surface of the sphere S. The N-dimensional input regions (the shapes of the various states) thus appear as somewhat distorted, N+1-dimensional projected regions on the sphere S. The new, projected vector in 3-D, denoted by $\bar{x}_p{}^*$ is the shadow of the tip of the 2-D vector $\bar{x}_b{}^*$ that the light from the center of the 3-D sphere casts on the 3-D sphere.

Several advantages arise as the result of such a projection, and these are discussed below. However, the distortion or warping that arises as a result of the projection according to the invention may at first glance seem to be a disadvantage; in fact, this apparent weakness is turned to great advantage in the neural network according to the invention.

To understand this, one should observe that as long as the neural network successfully classifies the input vector as lying in Iowa, it is irrelevant if the network does so as a result of evaluating the projected "globe" image instead of the original "flat map" image. As is explained below in greater detail, since the evaluation procedure is carried out automatically by the network according to the invention, the user or supervisory system is only aware of the "answer" given by the network.

Another property of the projection method according to the invention that one should observe in FIG. 5 is that the closer to the center C of the sphere S the base plane P* comes, the more distorted the base vectors become after projection. When the base plane almost intersects the center C, the projected pattern (the map of the continental U.S.) will almost completely cover one half of the sphere S. If the base plane (the original input space) were to intersect the center C, the projection of the plane would be a circumference of the circle, with no distinguishable projected region boundaries.

The property of increased distortion with increased proximity to the center C may not hold for other projection surfaces. The N+1-dimensional spherical surface S is the preferred projection surface, since it greatly simplifies calculations for most classes of problems to be solved by the neural network according to the invention, but other types of projection surfaces, for example, ellipsoidal, are possible according to the invention. The example illustrates, however, that distance from the center C is one parameter that the neural projection network according to the invention can adjust to change the character of the projection of the original N-dimensional input vectors onto the N+1-dimensional projection surface.

Figure 6:
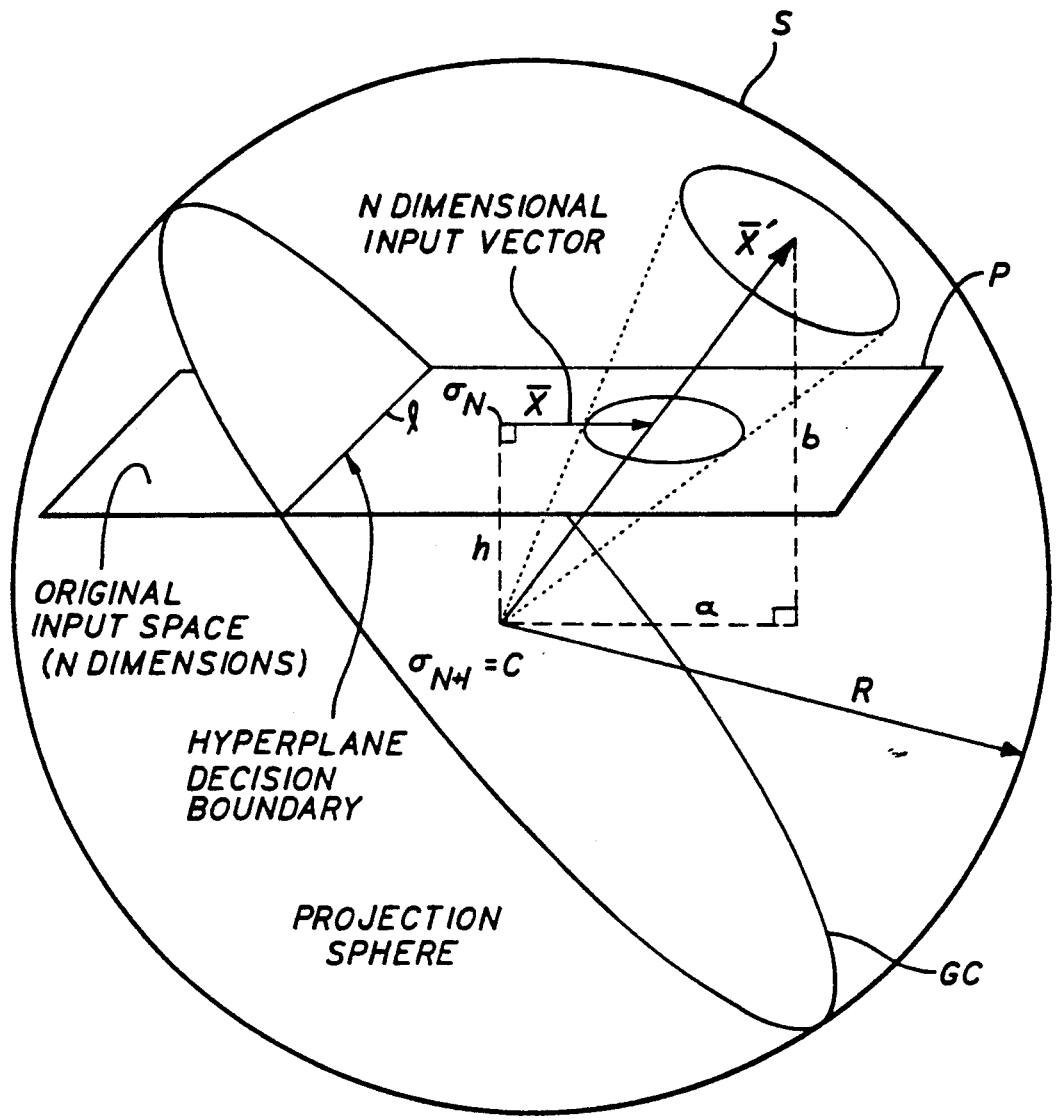
FIG. 6 is a geometrical illustration of the projection method according to the invention.

FIG. 6 is a more precise geometric illustration of the projection process according to the invention. In FIG. 6, the N-dimensional input vector $\bar{x}$ is projected from the N-dimensional plane (if N>2, P will be an N-dimensional space) onto the N+1-dimensional surface S as the projected input vector $\bar{x}'$. In the illustrated, preferred case, the surface S is a sphere, or, more correctly, a hypersphere (since its dimension will typically be greater than three) with radius R.

The plane P is at a distance h from the center C of the surface S. The quantity h, in the general case, is the distance between the origin $O_N$ of the N-dimensional space and the origin $O_{N+1}$ of the N+1-dimensional projection space (in the illustrated case, the center C of the sphere S).

By using the similar triangles (a/b = $|\bar{x}|$/h) and keeping in mind that the sphere on which the projected vector $\bar{x}'$ lies has radius R, $\bar{x}'$ can be shown to be:

(E1):

$$\bar{x}' = R \cdot \left( \frac{\bar{x}}{\sqrt{x^2 + h^2}}, \frac{h}{\sqrt{x^2 + h^2}} \right)$$

where $x^2 = |\bar{x}|$ = the magnitude of $\bar{x}$

Observe first that every $\bar{x}'$ has N+1 components, N of which are computed from the components of each $\bar{x}$, and the N+1$^{th}$ component (having h as its numerator) being added. Although it would be possible to "normalize" the input vectors without increasing their dimension by one (for example, simply by dividing each component of a vector by the magnitude of the vector and then multiplying the vector by R), this would lose potentially valuable information about the magnitude of each vector, and of the relative magnitudes of different vectors.

The projected vector $\bar{x}'$ is normal (perpendicular) to the plane containing the great circle GC, which intersects the plane P at a hyperplane decision boundary 1. One should note that the plane of the great circle GC may be defined in terms of the projected vector $\bar{x}'$ as the plane normal to $\bar{x}'$ and passing through the center C of the sphere S. Furthermore, the great circle plane bisects the base plane P just as would the planes used to enclose input regions in conventional neural networks (see FIG. 4(a)). A great circle is the circle formed as the intersection of a sphere and a plane that passes through the center of the sphere. Assuming the Earth is round, the equator is a great circle, since it lies in the plane that passes through the center of the Earth and divides the planet into northern and southern hemispheres. The Tropic of Capricorn, however, is not a great circle, since its plane does not pass through the center of the Earth.

Also note that, for every input vector $\bar{x}$, regardless of its magnitude, the corresponding projected vector $\bar{x}'$ has the magnitude R. In other words, regardless of the value of the components of the various input vectors, the corresponding projected vectors are normalized, that is, they are all constrained to lie on the predefined surface S which, in the preferred embodiment, is a sphere. Since the boundaries of all regions in the plane P are also defined by N-dimensional vectors in the plane P, even irregular boundaries can be mapped onto the surface of the sphere S. Also, as is described in detail below, all the weight vectors corresponding to the connections of the inputs to the hidden layer are also constrained to lie on the surface of a sphere (preferably, but not necessarily, to the same sphere as the projected input vectors).

Using the projection method defined in E1 and illustrated in FIG. 6, circular regions on the sphere S correspond to elliptical regions on the plane P. Although this results from the preferred projection (which simplifies many calculations), other projections are also possible. For example, the projection:

(E2):
$$\bar{x}' = R \cdot \left( \frac{\bar{x}/h}{1 + (x/2h)^2}, \frac{1 - (x/2h)^2}{1 + (x/2h)^2} \right)$$

where $x = |\bar{x}|$ = the magnitude of $\bar{x}$, maps circles onto circles.

Weighting and Training According to the Invention

Figure 7:
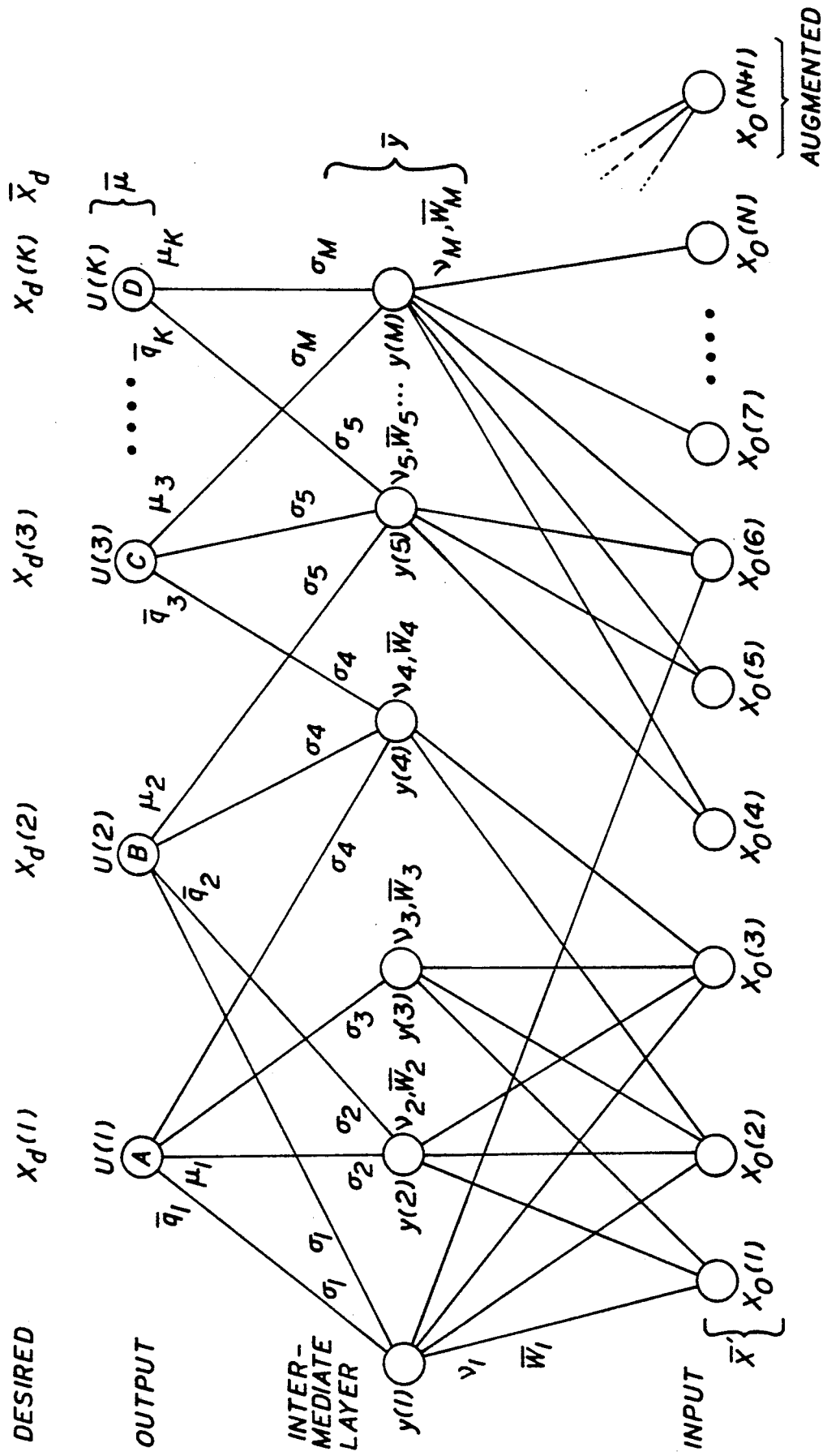
FIG. 7 shows the general structure of the neural network according to the invention.

FIG. 7 illustrates the general structure of the neural network according to the invention. The network has N+1 input nodes $x_0(1), x_0(2), \ldots, x_0(N+1)$, each of which stores one component (number) of the projected input vector $\bar{x}'$ (computed as defined above); M intermediate or hidden nodes $y(1), y(2), \ldots, y(M)$ containing scalar values; and K output nodes, each of which stores an output value $u(1), u(2), \ldots, u(K)$. It is neither necessary nor prohibited that N, M, or K be equal to each other, and it is possible to have more hidden layers, with the outputs from one hidden layer forming the inputs to another hidden layer. In the most general case, the hierarchical structure shown in FIG. 7 is not necessary. The output nodes, for example, could be connected directly to the input nodes, to "lower" intermediate nodes, etc.

For the purpose of illustration only, the output nodes are also labelled A, B, C, and D. Assume that one wishes the neural network to be able to recognize these letters of the alphabet, for example, in a document reader. The network according to the invention is of course not limited to recognizing just these four letters, or, for that matter, to recognizing letters at all; rather, any patterns that can be reduced to numerical form can be analyzed, or any well-behaved functions can be fit, by the neural network.

In the illustrated case, if the network determines that the input vector $\bar{x}$ corresponds to a "B," for example, then u(2) will be activated. Each of the expected outputs A–D defines a particular class of inputs. For example, one class of inputs will include the various "A's" one wishes to be able to identify (e.g., cursive, italic, capital, Gothic, etc.). The goal of the neural network is to determine, given an unknown input vector, which class it belongs to.

Each hidden node $y(\cdot)$ in the intermediate layer receives a value equal to the weighted value of the input vector $\bar{x}$ minus a "threshold" value $v$. More specifically, for each hidden node $y(j)$ there is an N+1-dimensional weight vector $\bar{w}_j$, and a scalar value $v_j$. The input to each hidden node is preferably computed as the vector or "dot" product of the weight vector and the projected input vector, minus the threshold value. Thus, the input to $y(j)$ is equal to:

(E3): $\bar{w}_j \cdot \bar{x}' - \xi_j, j=1,2,\ldots,M$

According to the invention, the output from each hidden node is obtained by operating the sigmoid function (see FIG. 3(b) and the accompanying explanation), or some other suitable function, on this input. In other words, the output $y(j)$ from each hidden node j is preferably:

(E4): $y(j) = \sigma(\bar{w}_j \cdot \bar{x}' - v_j), j=1,2,\ldots,M$

As is mentioned above, by operating the sigmoid function on the inputs to the hidden nodes, the outputs from the hidden nodes are all smooth and bounded (between zero and one, for example).

In FIG. 7, hidden node y(1) is shown as being connected to the input nodes $x_0(1)$, $x_0(2)$, and $x_0(6)$. In general, the neural network is fully connected, that is, each input node is connected to each hidden node. As is explained below, however, the optimization procedure according to the invention suppresses unneeded connections during training, although the invention also allows for incorporation of prior information about unneeded connections.

The output of each hidden node $y(j)$ is passed to the output nodes u(1) through u(K). In general, the output nodes also take a weighted sum of the outputs of the hidden layers times the weight vectors corresponding to their connections in a manner exactly analogous to that described for the hidden layers. Thus, a weight vector $\bar{q}$ and a threshold value $\mu$ is assigned to each output node u. Each weight vector $\bar{q}$ has M elements since, in the example illustrated in FIG. 7, there are M hidden nodes, each with an output. Let $\bar{y}$ be the vector containing the M values of the intermediate or hidden nodes. Preferably, according to the invention, the value of each output node $u(j)$ is determined as follows:

(E5): $u(j) = \sigma(\bar{q}_j \cdot \bar{y} - \mu_j), j=1,2,\ldots,K$

If the value of an output node exceeds zero (so that $\bar{q}_j \cdot \bar{y} - \mu_j > 0$), that output node "fires," indicating that the network has decided that the input vector best corresponds to that output node's associated value (in FIG. 7, for example, output node u(3) is associated with the letter "C"). In many applications, however, one may simply evaluate the value of each output node as is, and choose the output node(s) whose value(s) is (are) greatest. For example, if the values of output nodes u(1), u(2), u(3) and u(4) happen to be 0.65, 0.02. 0.14, and 0.34, respectively, the network can conclude that node u(1) (corresponding to "A" in the illustrated example) is most likely, followed by node u(4) ("D"), u(3) ("C"), and u(2) ("B"), in which case the output node values are analogous to probability values.

The application of the sigmoid function can in many cases be omitted from the output nodes, since operation of the sigmoid function on the inputs to the hidden layer immediately below the output layer usually sufficiently guarantees the smoothness and boundedness of the error function. (According to expression E5, the error function becomes a weighted sum of the smooth, sigmoid values of the hidden values.)

If there are additional hidden layers, they will follow the same procedure, and the nodes in each layer will receive as input values a weighted sum (possibly with threshold values as biases) of the values of the nodes of the layer immediately below it.

During training of the network, one inputs known vectors (that is, vectors belonging to known classes, such as "A's" or "B's"), so that one knows which output nodes "ought" to fire. In other words, during training, one can compare the actual results at the output nodes with the "correct" or "desired" values $x_d(1)$, $x_d(2)$, ..., $x_d(K)$. To quantify this comparison, the output nodes' actual values and the known, desired values are evaluated using a predetermined "error function." The concept of an error function is well understood in the art, and the function E may be chosen in any conventional manner, for example to incorporate any special knowledge about the class of patterns to be identified by the network, or to suit the user's particular hardware or computational needs.

One error function that has shown to be advantageous from both the theoretical and computational viewpoints during experiments with the invention is:

(E6):
$$E = \frac{1}{2} \cdot \sum_{i=1}^{K} [u(i) - x_d(i)]^2$$

where $E = E(\overline{w}_1', \overline{w}_2', \ldots, \overline{w}_M', v_1, v_2, \ldots, v_M, \overline{q}_1, \overline{q}_2, \ldots, \overline{q}_K, \mu_1, \mu_2, \ldots, \mu_3)$ In other words, the error function E is a measure of "dissimilarity" between the output nodes and the desired values. By squaring the differences, E is always greater than or equal to zero; the quadratic nature of the error function E also leads to known advantages during optimization. One should observe that E = 0 only if all the output nodes exactly match (are equal to) the desired values.

Moreover, the values u(i) and thus the value of E depend on all N+1 components each of the M weight vectors $\overline{w}'$, on all M threshold values $v$, on all M components of each of the K weight vectors q, and on all K of the threshold values $\mu$; the neural network thus can seek to minimize the error function E (which is equivalent to making $\overline{u}$ as "similar" as possible to $\overline{x}_d$) with respect to the weight vectors and the threshold values by adjusting the weights $\overline{w}'$, $\overline{q}$ and threshold values $v$, $\mu$ using known optimization methods, one of which is described below. Note that once an input vector $\overline{x}$ is projected as described above to form the projected input vector $\overline{x}'$, its values are fixed and are not adjusted. If the neural network succeeds in making E as small as possible, it will also have succeeded in adjusting its weight vectors so that the solutions the network has arrived at are as close as possible to the known, correct values.

There are many known methods for optimizing functions of several variables, and, according to the invention, any of these methods may be used to minimize the error function E. One such method, the "gradient descent method" is iterative, meaning that an optimum solution is found by assuming a starting value, then evaluating the gradient of the error function, then taking a small step opposite the gradient direction, then evaluating the gradient of the error function at that point, then taking another step, and so on, until the error is smaller than some predetermined, acceptable value.

As is well known in mathematics, a maximum or minimum value of a continuous and smooth function is found where the gradient of the function is zero. Using the gradient descent method of optimization, the system determines the partial derivative of E with respect to the vectors $\overline{w}_j$, that is:

$$\frac{\partial E}{\partial w_j}$$

in order to determine the direction of the correction to be applied to $\overline{w}_j$. The gradient of E also will include terms involving the partial derivative of E with respect to each of the threshold values $v$, that is:

$$\frac{\partial E}{\partial v_j}$$

in order to determine an updated value for each threshold. The optimization routine will similarly evaluate the gradient with respect to the output weight vectors $\overline{q}_i$ and the thresholds $\mu$.

Returning to the earlier analogy of finding the lowest point in hilly, foggy terrain, the gradient of E ($\nabla E$) indicates the direction and magnitude of maximal upward slope at any given point. According to the gradient descent method, one checks to see where, in one's immediate vicinity, the terrain slopes most sharply uphill, and one then goes for a set distance in the exact opposite direction. Unless the terrain is exceptionally uneven (for example, has a sheer cliff rising from a plateau), this "opposite gradient" will normally point in the direction of steepest downhill slope. The gradient descent method is the preferred, although not required, method according to the invention, and is the method that was used in experimental evaluations of the invention.

The method for selecting weight vectors $\overline{w}'$ according to the invention is also novel: the weight vectors $\overline{w}_j'$ connecting the projected inputs to the hidden layer are also constrained to lie on the projection surface. One way of normalizing the weight vectors is to apply a normalizing projection similar to the one used for input vectors (see expression E1 above). Thus, initially, one way of constraining the weight vector to lie on the sphere S is to let $\overline{w}_i'$ be:

E7):

-continued $$\overline{w}_i^{2'} = R \cdot \left( \frac{\overline{w}_i}{\sqrt{h^2 + w_i^2}}, \frac{h}{\sqrt{h^2 + w_i^2}} \right)$$

where $w_i^2 = |\overline{w}_i|^2$.

Note that this radius R is preferably the same as in the expression E1 above, thus constraining the weight vectors to lie on the same sphere as the projected input vectors. This is, however, not necessary, and the radius R in expression E7 may be chosen to be another constant. The only result of having different radii would be that the vector products $\overline{w}' \cdot \overline{x}'$ would be scaled differently, by a constant amount.

The standard gradient descent method will generally move the weight vector off of the sphere, and it would be necessary to recompute the weight vectors according to the expression E7 after each learning step. The preferred training method according to the invention, therefore, employs a computationally more efficient, revised gradient descent method designed to keep the weights on the sphere in 3-D or on the N+1-dimensional hypersphere for the case where the input vectors are N-dimensional. This preferred method is illustrated graphically in FIG. 8.

Assume that one begins with a weight vector $\overline{w}'^{(n)}$ (where n is an iteration number) that is constrained to lie on the surface of the sphere S, that is, its origin is the center C of the sphere S and has a length or magnitude equal to the radius R of the sphere. One thereafter evaluates the error function with respect to the projected input vector $\overline{x}'$, and all the weight vectors $\overline{w}$ and threshold values. Using known numerical methods, one then calculates the gradient $\nabla E$ of the error function and determines an unnormalized change $\nabla \overline{w}'$ in each weight vector according to the following expression:

E8):

$$\Delta \overline{w}' = R \cdot \frac{\overline{w}'^{(n)}}{R} \times \left( \frac{\overline{w}'^{(n)}}{R} \times \gamma \cdot \nabla E \right)$$

where x indicates the vector cross product and $\gamma$ is a predetermined step size factor, which determines how far away in the downward direction (the direction opposite the direction of $\nabla E$) the system should place the corrected weight vector. The weight vectors in expression E8 are divided by R for the sake of computational ease and efficiency, since the magnitude of $\overline{w}'/R$ then becomes $\overline{w}'R = 1.0$. Evaluating the cross products in expression E8 using the well-known "right hand rule" one will see that $\nabla \overline{w}'$ points in the direction of $-\nabla E$, that is, away from the gradient.

According to the invention, to place the new weight vector back onto the 3-D sphere (or N+1-dimensional hypersphere), the weight vector is normalized by dividing by the magnitude of the new weight vector and multiplying by R, that is:

(E9):

$$\overline{w}'^{(n+1)} = R \cdot \frac{\overline{w}'^{(n)} + \Delta \overline{w}'^{(n)}}{|\overline{w}'^{(n)} + \Delta \overline{w}'^{(n)}|}$$

where $|\cdot|$ indicates the magnitude of the vector sum. $\overline{w}'^{(n+1)}$ is thus also constrained to lie on the surface of the sphere S with radius R.

Referring to FIG. 4(a) once again, a neural network must establish "decision boundaries": it must decide whether a given input vector falls within a certain class or not. In the prior art, as is explained above, decision boundaries are formed by a collection of hyperplanes (which are lines in the 2-D case); according to the prior art, the network tried to find a set of hyperplanes that enclosed a region of the input space. Solutions that fall inside the decision region, for example, the region for "tree" patterns, are assumed to belong to the corresponding class (a tree). Solutions that fall outside the region are assumed not to belong to the class. As is discussed above, the inability to generate good first "guesses" and the inability to form closed regions lead to long training times and wasteful overuse of hidden nodes when using conventional neural networks.

Thanks to the unique method of projecting both input vectors and weight vectors onto a space of higher dimension, the neural network according to the invention is able not only to make very good initial guesses but also to converge much more quickly. One of the reasons for this improvement is that the invention is able to use both hyperspheres and hyperplanes as decision boundaries.

Figure 9:
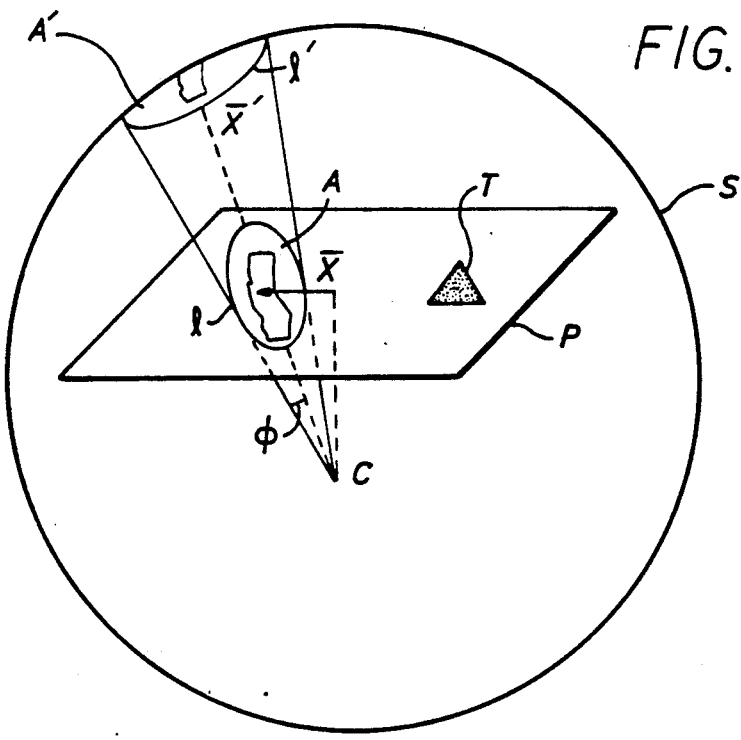
FIG. 9 illustrates the concept of closed, projected decision regions according to the invention.

FIG. 9 illustrates a major advantage of the invention, namely, the fact that a single hypersphere ("circular" region on the N+1-dimensional surface S) is fully sufficient to delimit a region of the original input space (the N-dimensional plane P). By choosing a vector $\overline{x}'$ and by defining an angle $\phi$, one also defines a "cone" around $\overline{x}'$ that intersects the plane P as an ellipse (or circle) 1, and a corresponding circular region A' bounded by the circular boundary line 1' on the surface of the sphere S. As FIG. 9 illustrates, the single elliptical region on the plane P is sufficient to enclose the class of inputs (in this case representing all vector inputs that fall inside the state of California).

Compare this with the set of planes that must be selected and shifted according to conventional "same-dimensional" methodology as illustrated in FIG. 4(a). Systems according to the prior art are limited to using planes when forming closed decision regions and are therefore not able to define the decision region with a single, simply-defined curved boundary as is possible using the invention (see FIG. 9 for an illustration).

Now the shape of the State of California may be said to be well-suited for enclosure by a single elliptical boundary line 1. Even more linear patterns such as the triangular region T shown in FIG. 9 will, however, still usually require fewer elliptical regions for satisfactory enclosure than planes.

Of course, three properly chosen planes could perfectly define the triangular region T, whereas curved shapes such as ellipses can only approximate its straight sides. First of all, such shapes are fortuitous and rare. Second, the projection method according to the invention enables the neural network to select decision hyperplanes as a special case of the normal hyperspheres.

Observe that the input to each intermediate node is $\overline{w}' \cdot \overline{x}' - v$. Since $\overline{w}'$ and $\overline{x}'$ both lie on a sphere of radius R, this expression is equivalent to:

(E10): $\overline{w}' \cdot \overline{x}' - v = R^2 \cdot \cos\theta - v$ where $\theta$ is the angle between the vectors $\overline{x}'$ and $\overline{w}'$.

Referring now once again to FIG. 3(b), which illustrates the sigmoid function $\sigma$ (smoothly interpolated between 0 and 1), for each intermediate node one must choose a decision threshold. The decision threshold determines at what point the network decides that the input vector falls within a given class so that the hidden node causes the corresponding output node to "fire." If the decision threshold for hidden node y(j) is chosen at $y(j) = \frac{1}{2}$, which occurs for $\sigma(0) = \frac{1}{2}$, then the decision surface of node y(j) is mapped by the equation $\overline{w}_j' \cdot \overline{x}' - \mu_j = 0$, or, equivalently, by the equation $\overline{w}_j' \cdot \overline{x}' = \nu_j$.

If $-R^2 < \nu_j < R^2$, then the decision surface is an N-dimensional hypersphere on the surface of the N+1-dimensional hypersphere (the decision surface becomes a "circle" on the surface of the sphere S). The larger $\nu$ is chosen to be, the closer together $\overline{x}'$ and $\overline{x}'$ are (since $\cos\theta$ increases as $\theta$, the angle between $\overline{w}'$ and $\overline{x}'$ gets smaller). This means that the larger $\cos\theta$ is chosen to be, the smaller the circular region on the surface of the sphere S the decision region will be.

Using the projection transformation E1 or E7 in reverse, the decision surface can be projected back down onto the N-dimensional hyperplane P. If the surface is completely contained on the hyperplane P it will have the shape of an ellipsoid (for example, in FIG. 9, the elliptical region A on the hyperplane corresponds to the hyperspherical ("circular") region A' on the sphere S.

For $\nu = R^2$, the decision surface reduces to a single point on the hypersphere S and all points in space lie on or outside the decision surface and for $\nu = -R^2$ all points lie on or inside the decision surface. For $|\nu| > R^2$, no solution exists on the hypersphere.

Figure 8:
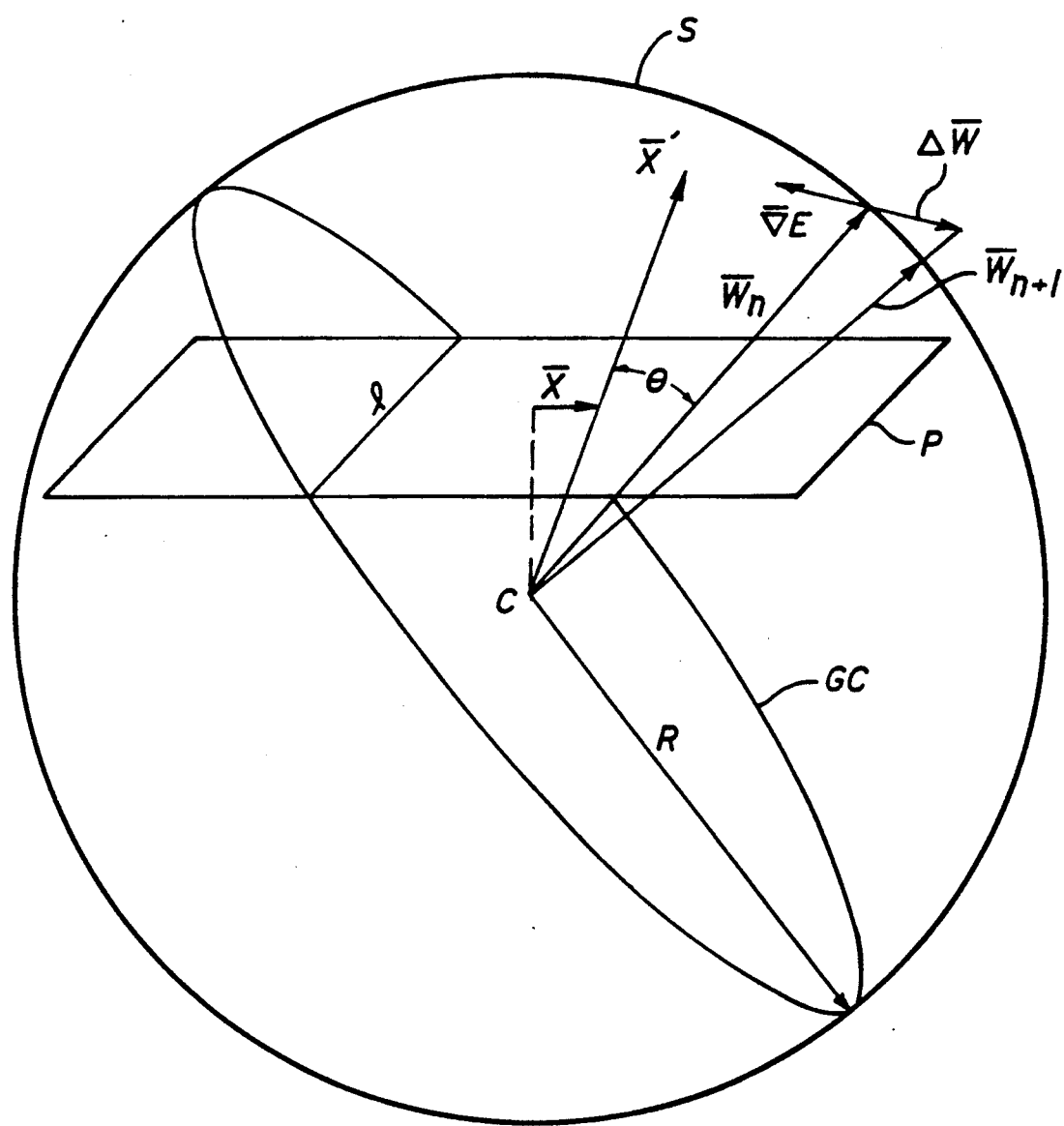
FIG. 8 illustrates a method according to the invention for adjusting and normalizing weight vectors during a training mode of the neural network.

If $\nu = 0$, $\overline{x}'$ and $\overline{w}'$ are perpendicular to one another, and the decision surface is reduced to a great circle GC as shown in FIG. 8. The projection of such a great circle back into N-dimensional space is simply the line 1 that intersects the plane P. In N dimensions, this will be an (N−1)-dimensional hyperplane. In other words, by setting $\nu = 0$, the network according to the invention can generate hyperplanes to form decision boundaries. This special case thus produces the same kind of boundaries as the N-dimensional network according to the prior art. Observe that it is not necessary for the decision threshold for output node u(j) to be set at $u(j) = \frac{1}{2}$, that is, $\sigma(0) = \frac{1}{2}$ (see FIG. 3(b)).

One great advantage of the system according to the invention is of course that the network is no longer required to use hyperplanes alone. Thanks to the method of projection according to the invention the network (or the user) may choose to use hyperplanes or hyperspheres or both as is deemed convenient or advantageous for the solution of any particular problem, whereas standard classifiers offer no such option. Another advantage is that through projection the invention offers a choice of open (everything on one side of a plane, for example) and closed (regions within a spherical boundary) decision surfaces.

For example, if the classification of a set of inputs requires the enclosure of a region (say a spherical region), a system using hyperplanes alone will require a minimum of N+1 hyperplanes in N dimensions to completely enclose the region. In contrast, the network according to the invention requires only a single hypersphere. Similarly, the division of space into two half-spaces requires only one properly located hyperplane, whereas a hypersphere classifier, in general, would need many hyperspheres to define a hyperplane surface with acceptable accuracy, and this problem becomes worse with increasing dimension.

Setting Weights and Thresholds

Now note that on the N+1-dimensional hypersphere the maximum possible value of the input $(\overline{w}' \cdot \overline{x}' - \nu)$ to any hidden layer node occurs when $\overline{w}' = \overline{x}'$ for any given threshold value. Therefore, if the weight vector $\overline{w}_j'$ for node y(j) in the hidden layer is set equal to some input $\overline{x}_i'$ of class c, that is, one sets $\overline{w}_j' = \overline{x}_i'$, then the output of the jth node y(j) will be at a maximum for any future projected input vector equal to $\overline{x}_i'$. Thus, the jth node becomes a "prototype" of class c and is designed to fire maximally when $\overline{x}'$ is the input. The threshold $\nu_j$ determines the radius of the hyperspherical decision boundary centered at the prototype.

In other words, assume the neural network is supposed 5 to recognize pictorial input patterns, that is, input vectors, corresponding to "tree," "house," and "person." Assume that one constructs projected input vectors—"prototypes"—corresponding to ten different variations each of trees ($\overline{t}(1), \overline{t}(2), \ldots, \overline{t}(10)$), houses ($\overline{h}(1), \overline{h}(2), \ldots, \overline{h}(10)$), and people ($\overline{p}(1), \overline{p}(2), \ldots, \overline{p}(10)$), for example, by scanning actual pictures of representative trees, houses and people using conventional equipment to create N-dimensional representations, which are then projected onto the N+1-dimensional surface using, for example, the expression E1. Each vector $\overline{t}$, $\overline{h}$, and $\overline{p}$ therefore has N+1 elements, and its magnitude is R.

Observe that this means that it is not necessary to normalize the initial weight vectors separately from the normalization of input vectors, since input vectors themselves are used as initial values for the weight vectors. Since updated values of the weight vectors are also constrained to the surface of the hypersphere using expressions E8 and E9, the weight vectors will always remain constrained to lie on the surface S, just as the projected input vectors $\overline{x}'$ are.

One then includes at least 30 intermediate nodes y(j) in the network (M ≥ 30) and sets the weight vector $\overline{w}'$ (N+1-dimensional) for each intermediate node equal to a respective one of the 30 prototypes. This means that if the input vector happens to be equal to any of the 30 known prototypes, then one of the intermediate nodes will fire maximally, since its weight vector will be exactly equal to the projected input vector, so that $\overline{w}' \cdot \overline{x}' = R^2 =$ the maximum degree of correspondence between the weight and the input.

In operation, what this means is that, by using actual prototype values as the starting "guesses" for the values for the weights of the nodes in the intermediate layer, one is assured that the first guesses all fall within the known classes of input vectors. Returning to FIG. 9, by setting the initial weights equal to the prototypes, the network starts its learning routine with good, if not complete, boundaries for the different classes of input vectors. One group of ten regions $A_t'$ on the sphere will correspond to "trees," another group of regions $A_{h+1}'$ will correspond to houses, and yet another group of ten regions $A_h'$ will correspond to people.

By selecting the associated threshold values $\nu$ for each intermediate node, one also selects how large (the radius) each region will have. If one is uncertain of the size of the class, the initial thresholds can be guessed and then allowed to adjust during the training process to their optimal size.

If one knows where on the projection surface one wishes to center the decision surface (a hypersphere), and one wishes the decision surface to have a certain radius, one may use the expressions defined above to calculate an appropriate weight vector (for the centering) and threshold value (for the radius). Also, by deliberately setting the weight vector perpendicular to the projected input vector, and by setting the threshold value $v$ to zero, one can generate a prototype hyperplane with a known line of intersection on the N-dimensional input space (the base plane P*).

Experiments with the invention have demonstrated that the ability to set initial weights to normalized prototypes of increased dimension allows the network according to the invention to converge much more rapidly on optimal weight values, that is, to properly classify input vectors, than is possible using known networks. Since the initial setting is near the optimal solution, the typical local minimum and the plateau regions discussed above are avoided. As FIG. 4(a) illustrates, it is computationally difficult to determine the proper number and position of hyperplanes to enclose a good first "guess," whereas the invention is able to determine closed boundary regions using a single vector, for example, the projection of an actual, known prototype vector.

Scaling

For many problems, it is advantageous to scale the input node values so that they vary between $-0.5$ and $+0.5$ (or some other range of small negative to positive values) rather than between 0 and 1. With the projection network according to the invention this may be important for problems of large dimension (N large), since $\overline{w}' \cdot \overline{x}'$ may be a large number. For example, if $\overline{x}$ is an N+1-dimensional vector with components on the order of unity, and if $\overline{w}'$ is initially set equal to $\overline{x}'$, then $\overline{w}' \cdot \overline{x}'$ will be of the order of $Nx^2 \sim n^2$, where $x$ is the magnitude of $\overline{x}'$. For a high-dimensional problem, say, $N=50$, $\overline{w}' \cdot \overline{x}'$ will be large (on the order of 2500), and $v$ will have to be set large to compensate for it.

The problem then arises that one is operating a sigmoid function (illustrated in FIG. 3(b)) on the differences between large numbers. As is known in the area of numerical analysis, this risks causing the intermediate layer activations to become either zero or one (in other words, one loses the "finesse" in the intermediate nodes, and ends up with either "all" or "nothing" in the values). This slows the learning process of the network. It is therefore generally advisable to keep $\overline{w}' \cdot \overline{x}'$ and $v$ sufficiently close to the central, linear, sloped range of the sigmoid function.

Initial Output Weights

Referring to FIG. 7, each output node $u$ is connected to at least one intermediate node $y$. In the preferred embodiment, the value of an output node is set equal to the weighted sum of the intermediate nodes connected to it, or to the value of the sigmoid operating on the weighted sum. This is explained above in connection with expression E5. Thus, $u(1)$ is connected to $y(1)$, $y(2)$, $y(3)$, and $y(4)$, so that:

$$u(1) = \sum_{i=1}^{4} \overline{q}_1(i) \cdot \overline{y}(i) - \mu_1$$

or $$u(1) = \sigma\left(\sum_{i=1}^{4} \overline{q}_1(i) \cdot \overline{y}(i) - \mu_1\right)$$

where $\overline{q}_1(i)$ is the i'th element of the weight vector $\overline{q}_1$; where ($\cdot$) is scalar multiplication; and where $\mu_1$ is the threshold value for output node $u(1)$.

In the preferred embodiment of the invention, each component of each output weight vector is initially set to one if the intermediate node corresponds to the same class of inputs as the output node to which it is connected and to zero if it is of some other class. Other weights having values between zero and one are also possible according to the invention. Thus, initially:

$$u(k) = \sum_{i=1}^{M} \delta_{ki} \cdot y(i) - \mu_k$$

where $\delta_{ki}=1$ when $y(i)$ is a prototype in class k and $\delta_{ki}=0$ when $y(i)$ is not a prototype in class k.

The thresholds $\mu$ are initially set to zero or some other small number near zero to cancel small contributions from prototypes of other classes. Then, as the network learns, the weights and thresholds are allowed to change according to the learning procedure. The preferred learning procedure on this level is the gradient descent procedure described earlier. Observe that it is not necessary to constrain the output vector to a sphere.

Network Separation and Separate Training

Figure 10:
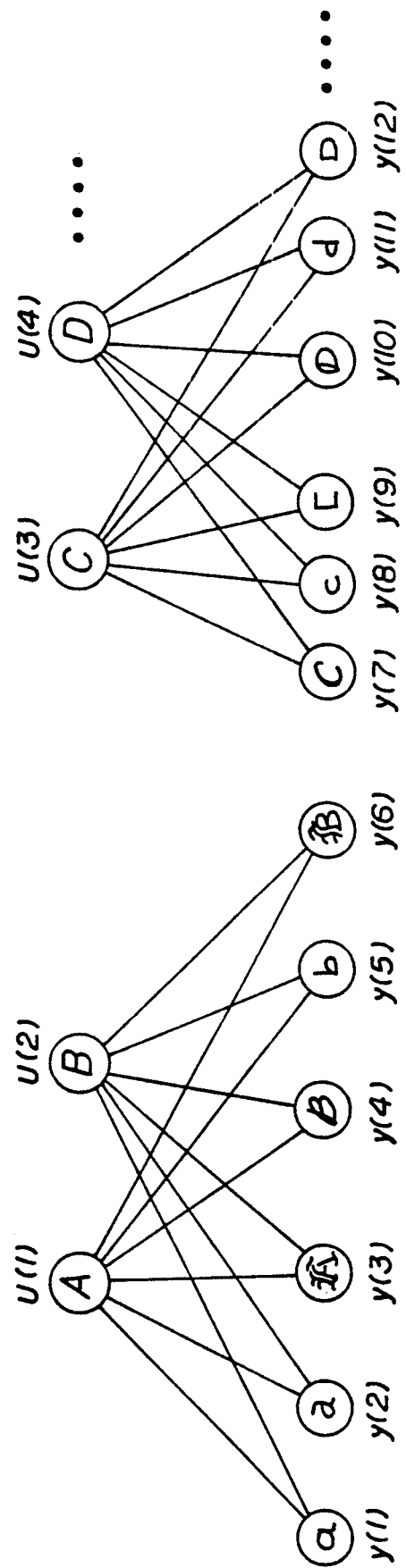
FIG. 10 illustrates the division of one neural network into two or more separately trainable networks that can be recombined into a single network after training.

FIG. 10 illustrates another advantage of the neural network according to the invention, namely, the ability, thanks to the projection method, to divide the neural network into separate modules in certain cases and thereby to make training easier. In FIG. 10, a portion of a neural network is shown: four output nodes $u(1)$ through $u(4)$, as well as twelve intermediate nodes $y(1)$ through $y(12)$.

Activation or "firing" of output node $u(1)$, $u(2)$, $u(3)$, or $u(4)$ indicates that the network has determined that the input belongs to the class of "A's", "B's", "C's", or "D's", respectively. Activation implies that the value of the node has exceeded its predetermined threshold, or is greater than the values of other output nodes, etc. (The activation criteria may be chosen according to the known needs and characteristics of a given problem.)

Nodes $y(1)$ through $y(3)$, which are prototypes of class "A", have weight vectors that are initially set equal to sample inputs known to be in class "A". Nodes $y(4)$ through $y(6)$, which are prototypes of class "B", have weight vectors that are initially set equal to sample inputs known to be in class "B". The other intermediate nodes $y(7)$ through $y(12)$, which are prototypes of other letters, have weight vectors initially set equal to sample inputs of the corresponding letters.

As the network is trained (by adjusting weights and thresholds for a given set of input training vectors known to be in either the class of "A's" or the class of "B's"), assume that the classes are sufficiently distinct that there is little or no overlap between the regions formed by the prototypes for "A's" and "B's", on the one hand, and for "C's" and "D's" on the other. This means that the intermediate nodes $y(7)$ through $y(12)$ will probably never contribute to the value of the output nodes u(1) and u(2), that is, the weights (the elements in the respective weight vectors $\bar{q}$) corresponding to the connections between u(1) and u(2) and y(7) through y(12) will be nearly zero.

In short, the portion of the neural network shown in FIG. 10 essentially acts as two separate networks, one for learning to distinguish "A's" from "B's", and another for learning to distinguish "C's" from "D's". This is made possible and much more probable by the ability of the network according to the invention to start with and usually remain in well-defined regions of the space S. What this also means is that the network can be trained as two (or more) separate networks, since the input classes are clearly separable; after training, these can then be recombined into one network.

Suppose that we train the network to recognize the letters A to Z and then decide that we wish also to recognize the numbers 0 to 9. With the network according to the invention, we can train a new network to recognize the numbers and then combine it with the original one that recognized the letters, without having to retrain the entire network from scratch as would be required according to the prior art. Some training after combination will typically be required since there usually will be some overlap between classes, but in general, this training time is far shorter than the time needed to train from scratch. Modular training is also advantageous if we wish to add a new font for the letters A to Z, since these can be represented by new prototypes of the letters rather than by a whole new class of input images.

Although it will sometimes not be possible to separate the network into "sub-networks," or to combine sub-networks into one network without substantial additional training, especially if there is a lot of overlap between the various prototypes, the likelihood is much greater using the network according to the invention. This is so since the invention starts out with prototypes as good first guesses and it therefore begins its optimization process much closer to the optimum point (rather than on a "plateau" or far from the global optimum point, thus risking becoming "trapped" in only local optima).

Multiple Hidden Layers

Figure 11:
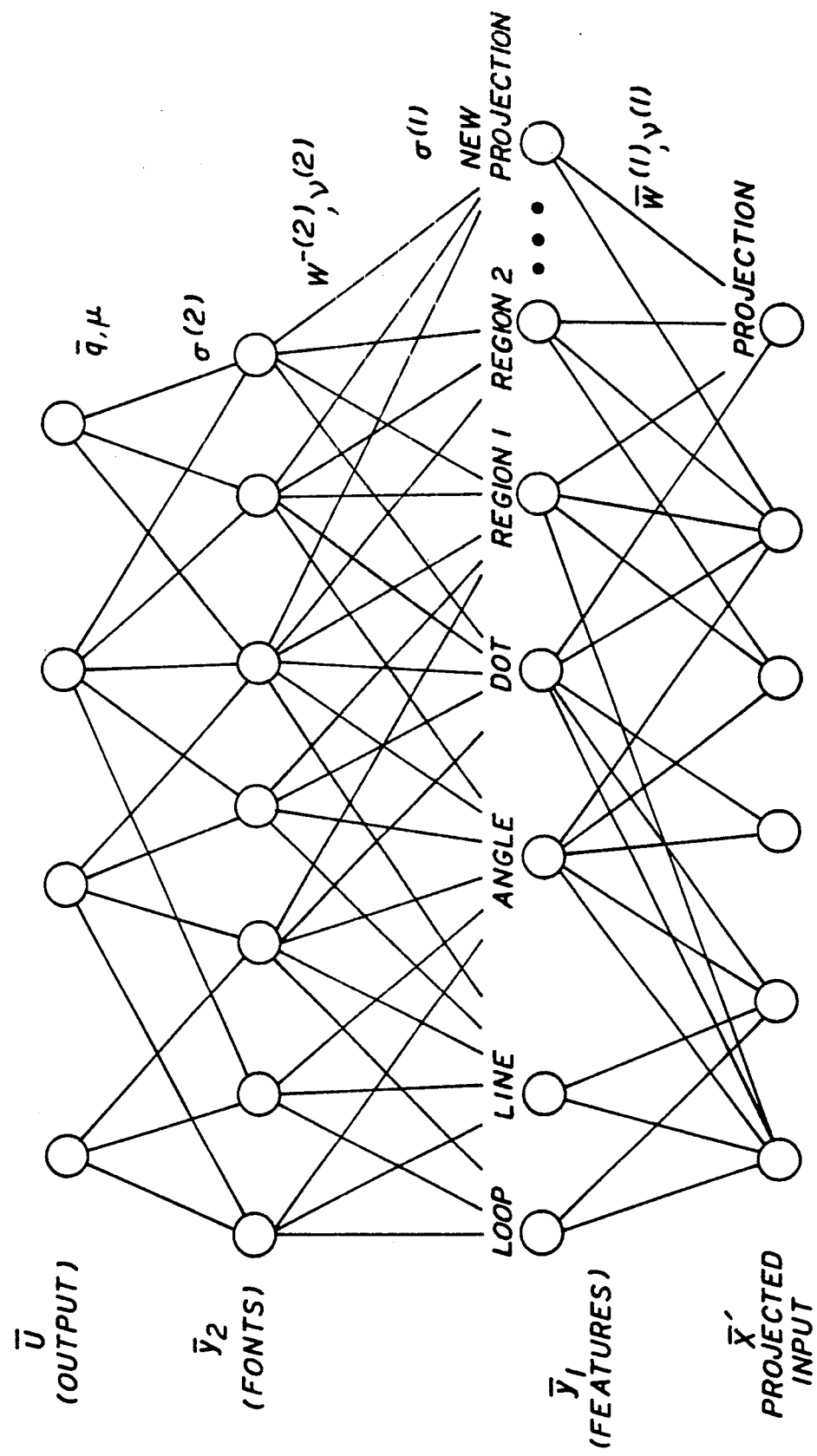
FIG. 11 illustrates a neural network with multiple hidden layers.

The invention is not limited to neural networks with only a single hidden layer, but rather, any number of hidden layers may be used in a projection neural network according to the invention. FIG. 11 illustrates a pattern recognition application in which there are two hidden or intermediate layers. Referring back for a moment to FIG. 2, assume the neural network is to recognize letters of the alphabet on the basis of digitized representations of their images.

As is mentioned above, the "A" in FIG. 2 can for example be represented by a string of 100 numbers in which grid elements 24–26, 34, 36, 43–47, 53 and 57 are "1's" and all the remaining elements are "0's." Suppose now that the letter were shifted downward a distance of three grid lines, so that the darkened grid square 43 is shifted to grid square 73. Even though the shape of the image would be exactly the same, its 100-element vector representation would be very different.

Having made this observation, one could instead choose to represent the image of the "A," and of other classes (other letters) in terms of their features. The "A" seen in FIG. 2, for example, could also be represented as an angle "∧" and a line segment "—". For the illustrated font for "A", these features would remain invariant regardless of where in the grid the "A" was located. Of course, the same is true for the features of other letters, substantially regardless of font.

For purposes of determining decision boundaries, therefore, it may in many cases be more efficient for the neural network first to classify inputs with respect to their features and then classify the features by fonts and letters, such as the various fonts illustrated in FIG. 10. Features might for example include such substantially invariant characteristics as whether the projected input image displays a loop, line, angle or dot, as well as other characteristics such as in which region of the grid the image is centered.

The network portion illustrated in FIG. 11 is arranged for such multiple classification, whereby the first hidden layer has weight vectors $\bar{w}'^{(1)}$ and thresholds $\bar{y}_1'$ corresponding to features and the second hidden layer $\bar{y}_2$ has weight vectors $\bar{w}'^{(2)}$ and thresholds $v^{(2)}$ corresponding to fonts. (The superscripted numbers in FIG. 11 refer to layers and not to iteration numbers.) In FIG. 11, the input vector is projected as in other cases to form the projected input vector $\bar{x}'$, whose dimension is at least one greater than that of the unprojected input vector. It is not always necessary to project intermediate layer values or weights, although any or all may be projected.

The network with more than one hidden layer is trained substantially in the same manner as the network with only a single hidden layer. In the multi-layer network, however, the error function will be a function of all the weight vectors and thresholds for all the hidden nodes in all the intermediate layers. As FIG. 11 illustrates, it is also possible according to the invention to add one or more additional nodes to the intermediate layers in order to project and normalize even the vectors formed by the values of the intermediate nodes. Sigmoid functions $\sigma$ preferably, but not necessarily, operate on the outputs of the nodes of one or more of the intermediate layers.

In a manner analogous to the one-hidden-layer network described above, the initial weight vector for each of the nodes in the first hidden layer $\bar{y}'_1$ may be st equal to known prototypes of images of the respective features. The initial weight vector for each of the nodes in the second hidden layer $\bar{y}_2$ may be set equal to known prototypes of images of the respective fonts. The training process will then be substantially the same as for the one-hidden-layer network, whereby the thresholds $v$ are adjusted and the weight vectors are adjusted and constrained to lie on the sphere (or other normalization surface).

As before, if portions of the network can be separated, they can be separately trained and recombined. New features or fonts can then also be added without the need for complete retraining of the network.

Function-Fitting

Figure 12A:
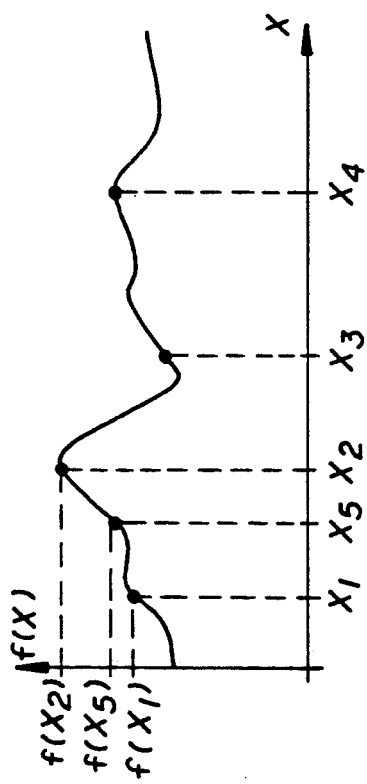
FIG. 12(*a*) illustrates a one-dimensional function-fitting problem.

The network according to the invention is useful in applications other than pattern recognition and classification. One other area of application is the class of problems known as function-fitting. FIG. 12(a) illustrates a one-dimensional function f(x), whose value depends on the single input variable x. (In most cases, the function f will have several input values, or "arguments".) Assume that one knows that for the input value $x_1$, the function f should take the value $f(x_1)$, that, for $x_2$, the function takes the value $f(x_2)$, and so on.

Suppose that four input values $x_1$ through $x_4$ are known. For this set of input values $(x_1, x_2, x_3, x_4)$, there is therefore a known set of output values $(f(x_1), f(x_2), f(x_3), f(x_4))$. If one then has an unknown input value $x_u$, one would want to be able to determine its function value $f(x_u)$ based on knowledge of the set of known input values. One would want to know, for example, whether the function value for $x_u$ is closer to the function value for $x_1$ than to the function value for one of the other known input values.

This problem is analogous to the problem of pattern recognition in that, for a given vector in input space, one wishes to determine a vector in output space to which the input vector most closely corresponds. The neural network according to the invention can therefore be applied to these problems in an analogous manner.

If there are N input values, these values are first formed into N-dimensional vectors $\bar{x}$. As before, these input vectors are then projected onto the sphere (or other normalization surface), thereby forming the $N+1$-dimensional projected input vector $\bar{x}'$. Intermediate nodes then form their values as the weighted and biased sums of the projected input vector, and an output vector, containing a set of output values, is formed as the weighted and biased sums of the values of the intermediate values.

According to the invention, the initial weights for the hidden nodes are set equal to prototype input vectors. Training input vectors are then applied to the network, which projects them, evaluates the output values, compares these output values with the known, desired output function values, and then adjusts the weights and thresholds until the error is minimized for the set of training vectors.

Figure 12B:
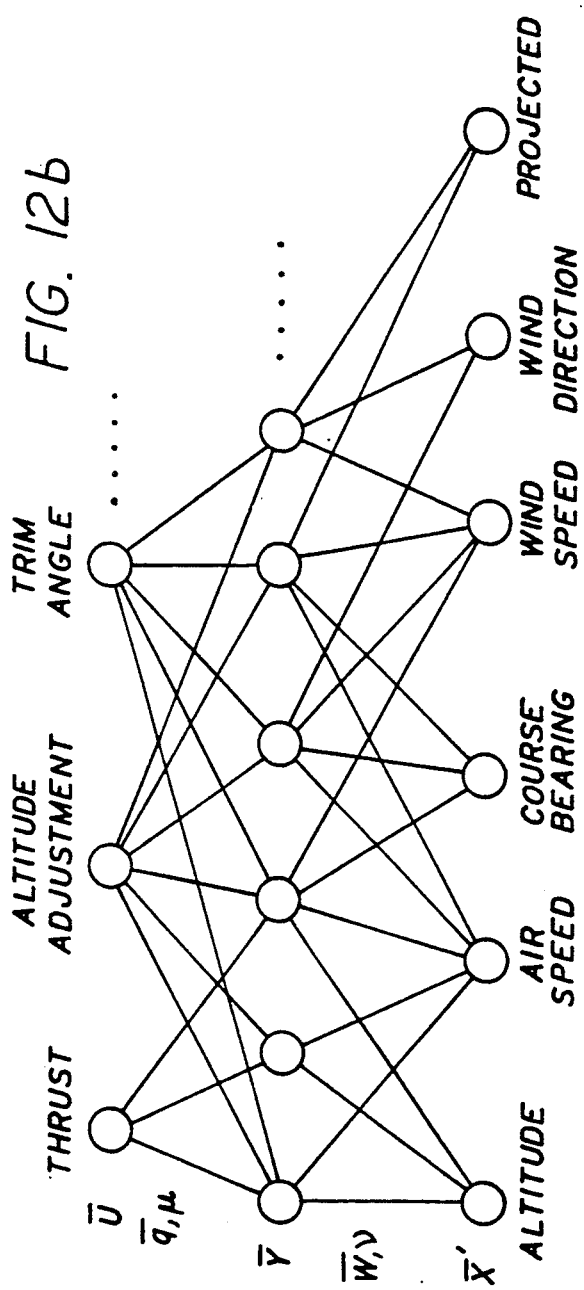

FIG. 12(b) shows a greatly simplified example of an application of the network according to the invention for the function-fitting problem of determining certain flight parameters for correcting for the wind acting on an airplane. The example is by way of illustration only; other input parameters and output values would almost certainly be necessary in a full-fledged neural-network based autopilot.

In the illustrated example, it is assumed that, for known values of altitude, air speed, course bearing, wind speed and wind direction there correspond known values of engine thrust, altitude correction, and trim angle to compensate for the wind. Through calculation or experiment, assume that one determines 50 sets of input values that lead to 50 sets of corresponding output values. Each set of input values can then be combined into an input training vector $\bar{x}$, whereby each known set of output values can be combined into a desired output vector.

At least one additional projection element is added to the input vector to form a projected input vector $\bar{x}'$ as before. After initial setting, normalized weights and thresholds are adjusted until the error is minimized as for pattern recognition applications described above. In pattern recognition problems, the neural network typically is to decide which of a set of output nodes is "best" or "closest" to a given input vector, that is, which of a set of classes the input vector belongs to. In contrast, in function-fitting problems, actual, quantitative values of the output nodes are typically sought. One is not interested in whether the input corresponds to "thrust" as opposed to "altitude adjustment," but rather what values of thrust and altitude adjustment should be applied given an input profile. Consequently, a sigmoid function $\sigma$ will normally not operate on the input values to intermediate nodes to form their output values.

In a function-fitting application such as the autopilot, one takes a set of "situation profiles" (corresponding to known training vectors of input values) and determines the proper "response" for each profile. The network "learns" by adjusting its weights and thresholds so that, for the set of training vectors, its overall response is as close as possible to the desired. When, during actual operation, measured or calculated input parameters are presented as the input vector to the network, the output values determined by the network will represent its estimate of the proper response to these values, based on its knowledge (embedded in the weights and thresholds) of the expected responses to the training vectors or "profiles." The network thus acts to interpolate or approximate the typically continuous "response function" based on the discrete representation it builds up from the finite number of training vectors.

Returning to the one-dimensional function-fitting problem illustrated in FIG. 12(a), if the neural network receives $x_1$ as the input, its "output node" (f(x)) should assume the value $f(x_1)$; the input $x_2$ should yield $f(x_2)$, and so on. If, after training and during actual operation, the network receives as its input a value $x_5$ on which it has not been trained and that is "between" $x_1$ and $x_2$, the network should output a value as close to the "correct" value $f(x_5)$ as possible.

In actual operation, however, only function values for the training vectors will be known (and even then not necessarily exactly) so that one will not know the "correct" or "optimal" value $f(x_5)$. Given discrete function points for the training vectors, the neural network, in choosing its weights and thresholds to minimize the error function, is effectively determining the parameters of the function that best fits the known values, whereby "best" is taken to mean that the fitted function provides a minimum value for the chosen error function.

In most function-fitting applications, there will be several elements (variables, such as "altitude," "air speed," etc.) in each input vector, so that the function will be a function of a vector. Furthermore, since there will typically also be more than one output value ("thrust," "trim angle," etc.), the output function itself will be a vector, so that the network is minimizing an error function that measures the difference between the vector output function of an input vector and corresponding output "goal" vectors.

In an application such as an autopilot according to the greatly simplified example of FIG. 12(b), known avionics systems of the airplane determine current values for altitude, air speed, bearing, etc. These values are then presented in numerical form to the neural network as the input vector $\bar{x}$. The network then projects the input vector as described above to form the projected input vector $\bar{x}'$.

The projected weights $\bar{w}'$ and thresholds $v$, determined during training, would then be applied to the projected input vector, and the output weights $\bar{q}$ and thresholds $\mu$ (if used) would then be applied to the values of the hidden nodes to form output values. These output values are then used by the control system of the aircraft to adjust thrust, altitude, trim angle, etc.

The method for minimizing this error function in function-fitting applications, is, however, essentially the same as for pattern recognition, with projection both of the input vectors and the weights onto a normalized surface. The advantages in training speed and computation efficiency are also the same.

The Training Process—Block Diagram

Figure 13:
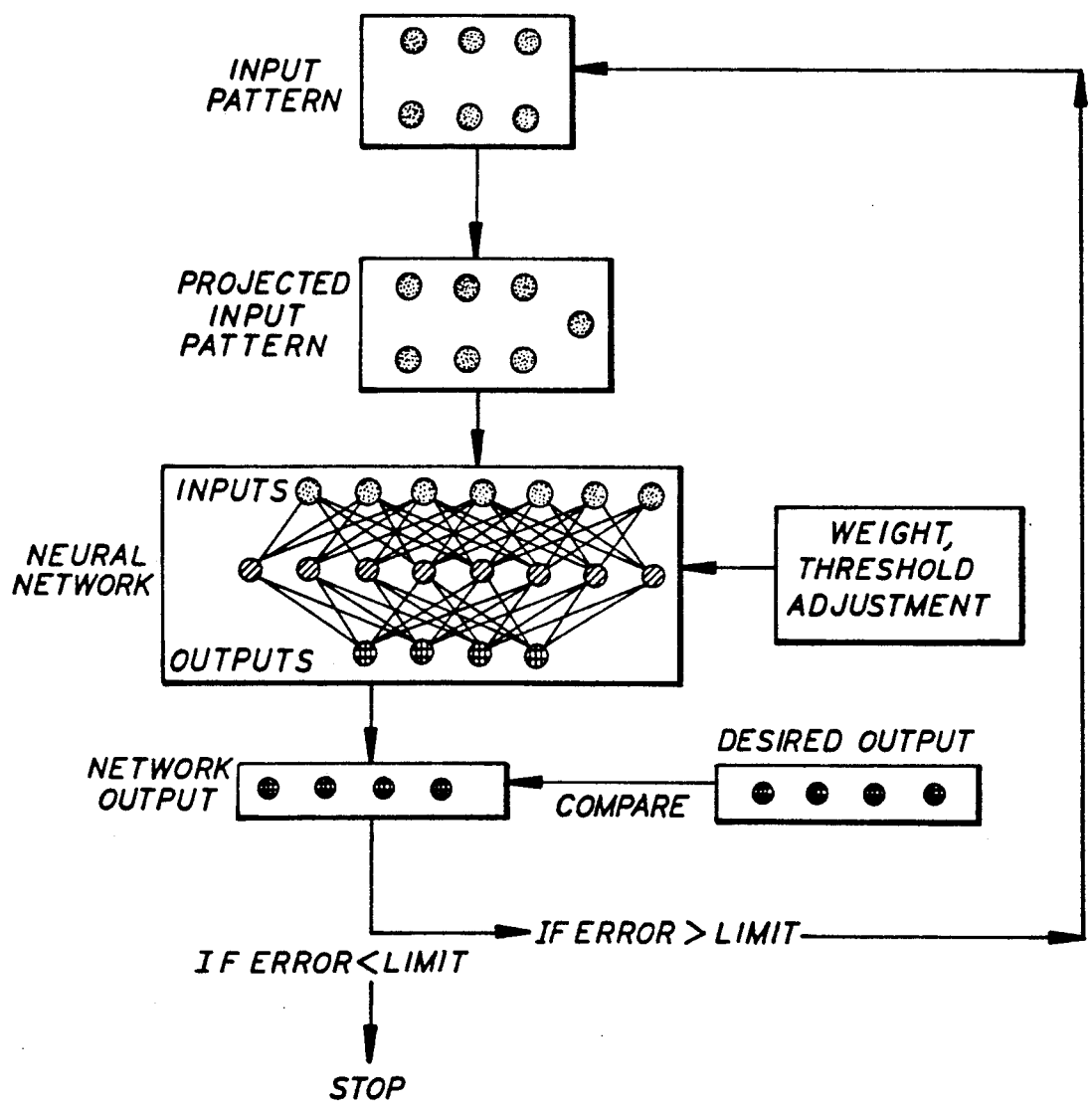
FIG. 13 is a simplified block diagram of the training process of the neural network according to the invention.

FIG. 13 is a simplified block diagram of the training process for the neural network according to the invention. As FIG. 13 shows, an N-dimensional input pattern or vector (shown as six dots) is first augmented by one element to produce the N+1-dimensional projected input pattern or vector. Each element of this projected input vector is assigned as a value for one of N+1 input nodes in the neural network. The neural network then evaluates the projected input vector as explained above using the weights, threshold values, etc. to generate a set of output node values. The network output (the collection of output node values compiled into a single output vector) is then compared with the desired output (the error function E, see expression E6, is evaluated).

Finally, if the error is below a predetermined limit of acceptability, the training process is completed and the network stops. Its weights and threshold values will then have converged to values yielding sufficient the value of the error function is too great, the weight vectors and threshold values are adjusted ($\Delta \overline{w}$ is computed according to expressions E8 and E9), and the system once again evaluates the input vector. After a sufficient number of adjustments of the weights and thresholds, the neural network will normally converge.

Prototype Selection

Figure 14:
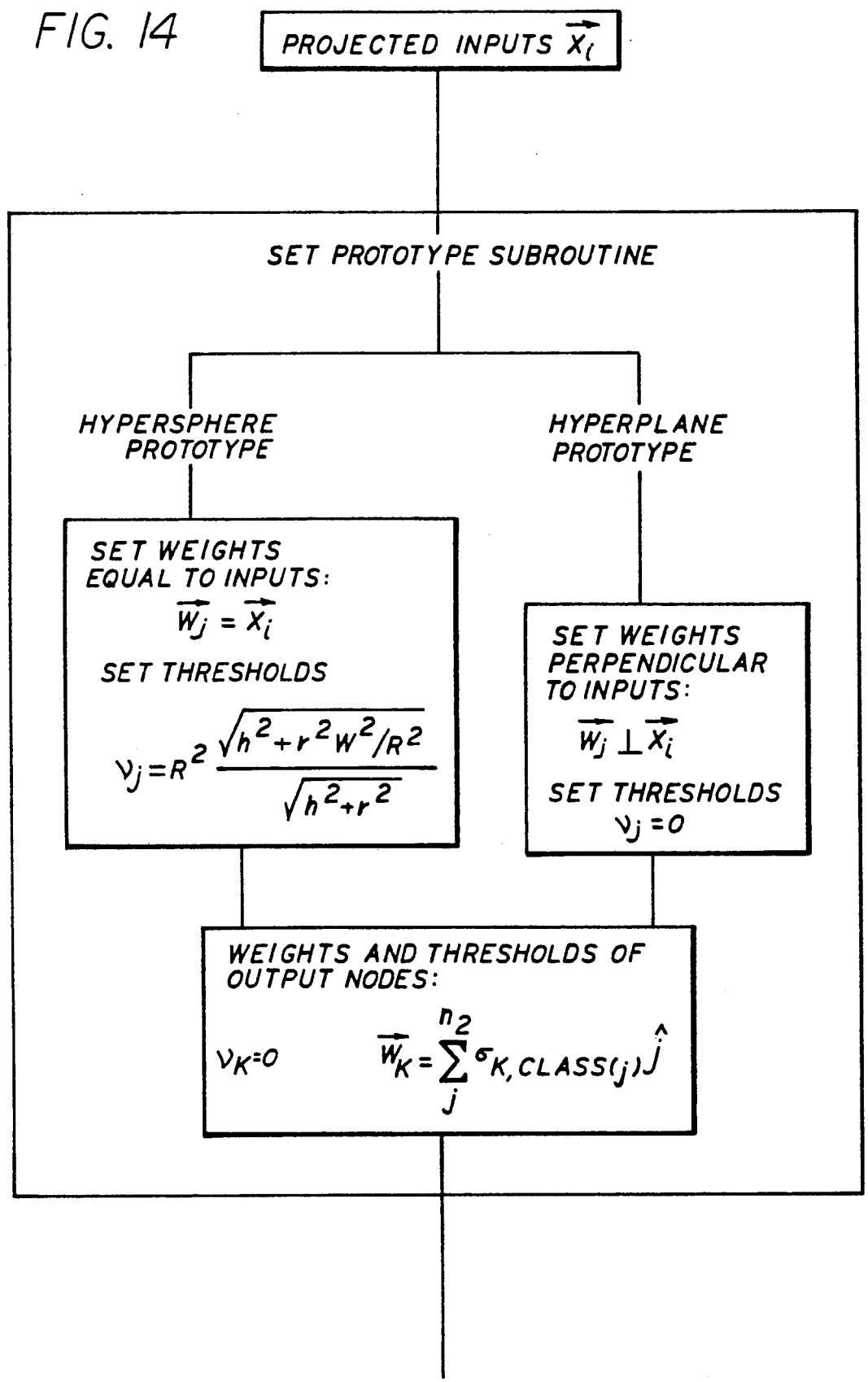
FIG. 14 is a simplified block diagram showing the procedure for selecting pattern prototypes according to the invention.

FIG. 14 is a simplified block diagram of the method according to the invention for selecting prototype values, which are used as "first guesses" for the projected weight vectors $\overline{w}$. Given an N+1-dimensional projected input representing a prototype vector in a known class, one first decides whether to use a hypersphere or a hyperplane (if one knows, for example, that the decision space has linear boundaries). If hyperspheres are selected, the network sets the N+1-dimensional weight vector $\overline{w}_j$ for intermediate node y(j) equal to the projected input vector and sets the threshold value so that the prototype hypershpere has some predetermined radius when projected back onto the N-dimensional space (the plane P*).

If one instead wishes to select a hyperplane prototype, the network sets the weight vector perpendicular to the projected input, and sets the threshold value equal to zero. Observe that it is possible to begin with hyperspheres and that the network is able to converge such that the ultimate projected weight vector $\overline{w}$ is perpendicular to the projected input vector, with the threshold value $v$ converging to zero, or vice versa. Finally, the output weight vectors $\overline{q}$ and thresholds $\mu$ are then set to their predetermined initial values.

Recognition System According to the Invention

Figure 15:
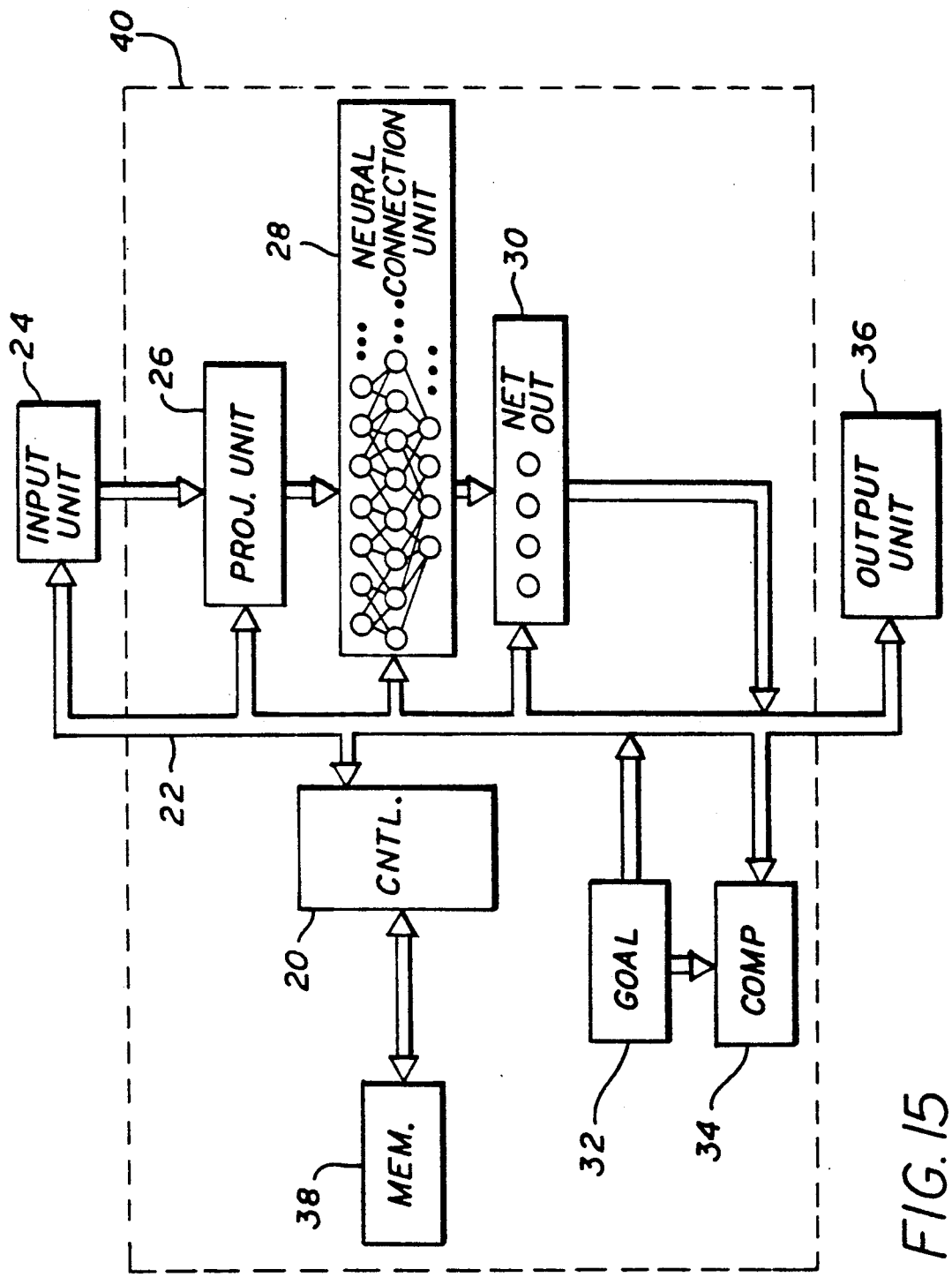
FIG. 15 is a simplified block diagram of a complete pattern recognition system incorporating the neural network according to the invention.

FIG. 15 is a block diagram of the pattern recognition system according to the invention. A processor/controller 20 is connected via an internal or external data and/or address bus 22 to an input unit 24, a projection unit 26, a neural connection unit 28, a network output storage unit 30, a goal value unit 32, a comparison unit 34, and an output unit 36.

The processor/controller 20 may be a computer, a microprocessor, or a part of a computer or processor, or even a set of computers or processors working as parallel processors. Parallel processing would be especially advantageous for pattern recognition problems having very high dimensions, with input patterns that could be separated into such distinct classes that the network could be separated as explained in conjunction with the discussion of FIG. 10 above. The bus 22 may be any convention data and/or address bus compatible with the chosen processor/controller.

The input unit 24 may be any unit which converts input patterns in numerical form, having N numerical input values that form the N-dimensional input vectors. Such input units include, but are in no way limited to, document scanners, digitizers, image scanners including CCD-devices, video cameras, radiotelescopes, etc., including those that operate with non-visible wavelengths, speech digitizers, digital seismographic output units, and so on.

The input vectors may also represent sampled or predetermined functional values in problems involving function-fitting or general optimization. Referring by way of example once again to FIG. 12(b), the input unit 24 in an application such as an autopilot would correspond to or include the interface and input circuitry by which measurement data from flight instruments such as the altimeter, airspeed indicator, inertial or radio navigation systems, magnetic or gyro compass, etc., is accumulated and entered into the onboard computers or neural network processor.

The input unit 24 may also be another processor or computer, or a memory or other storage unit belonging to or shared with another processor or computer. For example, cryptography also involves the recognition of patterns—encoded ones, but patterns nonetheless—and in such case strings of encoded patterns may constitute the input vectors to the system.

Under the control of the processor 20, the numerical values generated by the input unit 24 are stored in corresponding memory units, located either in an N-dimensional input memory buffer of the projection unit 26, or in N memory words of an internal or external memory unit 38. The controller/processor 20 then calculates the N+1-dimensional projected input vector $\overline{x}'$ as described above and stores the N+1 elements either in the memory unit 38, an output memory buffer in the projection unit 26, or in an N+1-dimensional input memory array in the neural connection network 28.

The neural connection unit 28 is preferably also configured as a set of memory arrays, with a network input array at least for the N+1 elements of the projected input vector, an intermediate or "hidden" array having at least M memory positions for the values, weights and thresholds of the intermediate nodes (and additional memory positions for all the values, weights and thresholds of any other hidden layers), and a network output array with at least K memory positions for storing the values of the output nodes, plus sufficient memory positions for storing the output weights and thresholds.

The input array may also contain memory positions for holding such parameters as h (the distance from the hyperplane P* to the center C of the sphere S). These parameters, which are associated with the projection routine, may also or instead be stored in corresponding memory positions in the projection unit 26. Furthermore, since the output of the projection unit 26 (projected input vectors) forms the values input to the network, it is also possible to arrange a single memory array for the projection unit and the input array of the neural connection unit 28.

The intermediate memory array may also include positions for all of the elements of all of the weight vectors and threshold values, as well as other memory positions, for example, in case one wishes to keep track of which prototype vector each intermediate node corresponds to.

The network output storage unit 30 is also preferably a memory array for storing the values of the output nodes. It may consequently be the same array as the network output array in the neural connection unit, or just the section of that array that contains the output node values.

The goal value unit 32 is also a memory array containing the elements of one or more of the desired output vectors $\bar{x}_d$ (see FIG. 7). During the training phase of the system, the current output vector $\bar{u}$ from the neural network is compared with the desired output in the comparison unit 34 to determine whether the difference is above a preset error threshold (stored in a memory position either in the comparison unit or in another memory device in the system). If the error is above the threshold, then the weights and thresholds for the intermediate layer are recalculated (the system takes another step in its iterative optimization routine such as the gradient descent method) and reruns the network with the updated vales.

The processor/controller 20 also serves as a calculation unit and either is or includes known hardware, firmware or software to perform the calculations according to the method described above for computing weights and thresholds, for projecting and normalizing input and weight vectors, for evaluating the error function, for carrying out the optimization routine such as the gradient descent method, for determining the values for intermediate and output nodes, for performing the actual comparison between goal and output values, etc.

The processor/controller 20 also directs the transfer of data between the different units and network layers (indicated by arrows between diagram blocks). All such transfers may be carried out in a known manner over the system bus 22. A program and data storage memory unit 38 of a known type is preferably also included for permanent or temporary storage of processor instructions, network parameters, and variable data such as weight vectors. Because any or all of the non-processor units illustrated within the dashed line 40 in FIG. 15 preferably consist of memory units, with the processor 20 carrying out the actual calculations and data transfers as required, all of these non-processor units may be implemented as sections of a single memory device connected to the processor 20 in a known manner.

Furthermore, in certain applications, it is also possible to incorporate the entire system within the dashed line 40 into a single programmable integrated device (for example, using VLSI technology). This would be particularly advantageous in applications with well-known requirements and/or space constraints. For example, once a neural network has been trained to recognize the desired fonts, or has been trained to direct the arm of a robot in a desired manner, the network can be implemented in mass-produced integrated circuits for incorporation into, for example, document scanners or production robots.

The output unit 36 may be any device for indicating to the user the results either of a training session for the neural network or the actual decisions of the network in an operational, non-training mode with unknown input vectors. A display, a speech synthesizer, a plotter, or even another computer system could all be used as output units depending on how one wishes to examine the results of the network.

Assume the network is designed to scan documents. The output unit could then even consist of a set of small solenoids acting as a Braille transducer to allow the blind to read books. The output unit could even be a lock system with two states (open and closed), whereby the lock opens only when the neural network according to the invention recognizes as authorized a fingerprint scanned and digitized by the input unit 24 matches. In short, the output unit could be any device for presenting to the user or superior system the decisions of the neural network concerning a numerically represented input pattern.

Operational Mode

Most of the discussion above has concentrated on the greatly improved ability of the neural network according to the invention to learn, that is, to converge to a set of weights, thresholds and node connections that accurately classify the set of input vectors. The iterative training method is described above in detail.

When the training phase is completed, however, one assumes that the weights and thresholds then present in the different layers of the neural network allow the network to distinguish between the various input classes as well as possible. Thereafter, the trained network is used to classify unknown input vectors. For example, assume that, during the training mode, the network optimized its parameters using prototypes for images of oak, elm, maple, cedar, and pine trees, and for houses with flat, gabled, slanted, and dome-shaped roofs. If an actual input vector numerically representing an image of a spruce is entered into the system via the input unit, the neural network according to the invention will first project the vector into $N+1$-dimensional space, and the output node having the greatest value will be selected as the decision. If the network has been adequately trained, the output node corresponding to "tree" will be activated.

In other words, during the operational mode, there are no longer "desired" vectors to compare outputs to, since the input vector is in an unknown class. As such, the processor 20 will normally transfer the network output signals directly to the output unit, bypassing the comparison procedure, possibly after some conversion of the output signals into some predetermined desired form for presentation.

Experimental Results

A prototype of the neural network according to the invention was applied to a selected problems. The results demonstrated two of the main advantages of the projection network, namely, its ability to reduce the required number of hidden layer nodes by using hyperspheres or hyperplanes, and its ability to reduce training time by setting good initial values of the weights and thresholds.

Two-Dimensional Test

One test of the invention involved a simple two-dimensional problem and a comparison of the results achieved by a conventional back-propagation neural network (illustrated in FIG. 16(a)-(c) and by the network according to the invention (illustrated in FIG. 16(d)-(f). The problem included two classes of points spread over a two-dimensional space, with class shaded and class 2 non-shaded. Two regions, one circular and one half-planar, were of class 1.

A hyperplane classifier such as the conventional back-propagation neural network (BPNN) must have three lines to enclose the circle and an additional line to separate the shaded region at the right. Since each line requires a hidden-layer node, the BPNN system requires at least four hidden nodes for even the coarsest classification of the one-circle, one-half-plane problem illustrated in FIG. 16.

A classifier such as an RCE system that only uses hyperspheres, however, would typically require several circles (each corresponding to a separate hidden node) to define the linear boundary of the shaded region to the right, especially if the circles are not allowed to expand so that arc sections become "straighter." (See FIG. 4(b).) A hypersphere classifier will, however, need only one circular prototype to enclose the circle, provided that the prototype is allowed to shrink and expand during training; otherwise it will again need more than one prototype.

In contrast, the projection network according to the invention needs only two prototypes, and therefore only two intermediate layer nodes, to classify the circular and rectangular regions.

A standard BPNN with four hidden layer nodes was trained on this data, with two input nodes corresponding to the x and y coordinates of the input point, and a single output node which gave the class of the input point. As is illustrated in FIG. 16(a), at the beginning of the training process, the BPNN tried to classify the inputs with just a single hyperplane (a line in two dimensions as indicated by the dashed line).

Between 5,000 and 50,000 trials, the BPNN adjusted this single hyperplane (line) for its optimal results, and the fraction of points misclassified varied from 40% to 50%. This was a local minimum, which delayed the training process. At 55,000 trials, the network brought in a second hyperplane (shown as the second dashed line in 16(b)), and between 55,000 and 90,000 trials it adjusted both hyperplanes (lines) to obtain its best results. This corresponded to a second local minimum.

At 95,000 trials, a third hyperplane and, shortly thereafter, the fourth hyperplane was engaged and adjusted until final solution was reached, as shown in FIG. 16(c). The error then dropped from 27% to 5%. This tendency of a conventional BPNN to attempt to solve a problem by sequentially engaging one hyperplane at a time is largely responsible for the delays caused by local minima for this problem and for large classes of problems when using networks according to the prior art.

In contrast, the projected network according to the invention can immediately engage all the hidden layer nodes as prototypes, and thus avoid the local minima corresponding to solutions found by using an insufficient number of hidden layer nodes. To demonstrate this, the projected network according to the invention was trained on the same data, with only two hidden layer nodes and the same number of output nodes as the BPNN, and with one additional (projected) input node.

The initial solution of the network according to the invention (see FIG. 16(d)), already used both hyperspheres (two circles), since they were initially set equal to input points chosen at random. The initial fraction misclassified without training was 26.8%. Between 0 and 10,000 trials, it adjusted these two prototypes (see FIG. 16 (e)); the network expanded one circle to match the circular gray region, and the other was expanded until it approached a line coinciding with the linear boundary (the corresponding threshold $\nu$ approached zero). At 10,000 trials, the decision boundaries closely matched the class boundaries, and the fraction of misclassified points dropped to 5.6% (see FIG. (f)). In other words, the neural network according to the invention achieved the same degree of accuracy (approximately 5%) in after fewer than one-ninth as many trials as the conventional network.

Character Recognition Test

The projection network according to the invention was also tested against a conventional system on a more practical problem, which also demonstrated the modular nature of the invention. The network was applied to an optical character recognition (OCR) problem, which consisted of the 26 letters of the alphabet, each represented on a seven-by-ten grid of pixels with gray scale values ranging from $-0.5$ to $+0.5$.

Each character was allowed to translate or "shift" by one or two pixels in each direction for a total of nine possible positions of each character on the grid. Also, to each pixel gray value was added noise of amplitude $\pm 0.7$ times a random number between 0 and 1; the noise value was then truncated back to the range $-0.5$ to $+0.5$ if the addition of noise took the pixel value beyond this range. As FIG. 17 illustrates, these translations, coupled with the high level of noise, made the characters (of which "A", "B", and "C" are illustrated) difficult to recognize even with the human eye.

A standard back propagation network (BPNN) with initially random weights performed poorly on this problem. It had 70 (one each for the 70 pixel values) input nodes, 26 output nodes (one for each letter A-Z) and 1000 intermediate level nodes. After 63,000 trials, which corresponds to 210 passes over the training set of 300 training vectors, it still misclassified 54.1% of the inputs, and after 255,000 trials (850 passes), it missed 32.5% of the characters.

The projection neural network according to the invention that was used for this problem had 71 inputs corresponding to the 70 grid pixels plus the one additional projected input node, 26 outputs corresponding to the 26 letters of the alphabet and 250 intermediate layer nodes. With just the initial setting of the weights and thresholds (without any training at all) and 250 intermediate layer nodes, the projection network missed an average of 26.9% of the characters. After training for just 1800 trials (6 passes over the training set), the fraction missed dropped to an average of 12.8% per class.

Of course, it would have been possible to reduce the fraction of misclassified characters even further by including a larger number of samples in the input set and training for longer times. Even the small training set, however, demonstrated the greatly increased learning efficiency of the neural network according to the invention: even after more than 141 times as many passes over the input set, the conventional network still had an error that was more than 250% larger than that for the network according to the invention. Furthermore, the neural network according to the invention achieved these vastly superior results using only one fourth as many intermediate nodes as were needed in the conventional network.

The advantage of the modular nature of the projection network according to the invention was demonstrated by combining two separately trained networks.

One network was trained with 124 intermediate level nodes and 12 output nodes to recognize the letters A through L, and another network was trained with 126 intermediate level nodes and 14 output nodes to recognize M through Z. After 5,000 trials, the first network misclassified 3.4% of the characters and the second network misclassified 1.2% of the characters. After combining the two sub-networks, and without additional training, the average misclassification error was 6.9%. After 6,000 trials, the fraction missed dropped to 3.1% and after 13,000 trials, it was 2.9%. The important result of this experiment was that the combined network showed a low initial error, demonstrating that the projection network can be nearly modular, and that the combination of projection networks in real applications is practical.

The training method according to the preferred embodiment of the invention, which is described in detail above, is a modified back-propagation method using gradient descent. Other training procedures can also be applied to the projection network, provided that care is taken so that the weights remain confined to the (N+1)-dimensional hypersphere.

Several alternatives for procedures and system components have been described above. All such variations on the invention are encompassed by the following claims.

We claim:

1. A data processing system comprising:
   a) input means for representing each of a series of input data groups as a sequence of N numerical values to form corresponding N-dimensional base input vector, and for storing each base input vector;
   b) neural network means including:
      i) input layer storage means, intermediate layer storage means and output layer storage means;
      ii) said input layer storage means comprising xat least N+j projected input memory units, where j is a predetermined positive integer, for storing a normalized projected input vector having N+j numerical elements, with each projected input vector corresponding to one of the base input vectors;
      iii) said intermediate layer storage means comprising a plurality of intermediate memory units for storing predetermined intermediate threshold values and intermediate weight vectors;
      iii) said intermediate layer storage means comprising a plurality of intermediate memory units for storing hidden node network values;
      iv) said output layer storage means comprising a network output node for storing a network output value;
      v) connection means for connecting each projected input memory unit with predetermined ones of the intermediate memory units and for connecting the output node with predetermined ones of intermediate memory units;
   c) processor and control means;
      i) for augmenting each N-dimensional base input vector with j projection elements to form said projected input vector;
      ii) for computing an intermediate threshold value and an intermediate weight vector, with each weight vector having N+j weight elements, for each intermediate memory unit in a lowest intermediate layer; and
      iii) for computing an output value as a predetermined function of the intermediate weight vectors, the intermediate thresholds values and the projected input vectors;
   d) connection means;
      i) for connecting the input means to the processor and control means;
      ii) for connecting the input means to the neural network means; and
      iii) for connecting the neural network means to the processor and control means.

2. A system as defined in claim 1, in which the processor and control means is further provided for normalizing the elements of the projected input vector so that the magnitude of the projected input vector is equal to a predetermined input normalization value; and for normalizing the elements of the intermediate weight vectors so that the magnitude of each intermediate weight vector is equal to a predetermined weight normalization value.

3. A system as defined in claim 2, including N+j weight elements for each weight vector in the lowest layer of intermediate layer storage means in the neural network means.

4. A system according to claim 1, wherein said network output value is recursively compared to a predetermined goal vector, further including:
   comparison means for comparing the network output value with predetermined goal vectors; and in which the processor and control means is further provided for recomputing the intermediate threshold values and intermediate weight vectors until the network output values differ by less than a predetermined minimum threshold amount from the corresponding goal vectors.

5. A system as defined in claim 1 which further includes a plurality of output nodes, in which the processor and control means is further provided for computing an output threshold value and an output weight vector for each output node and in which the processor and control means is further provided for recomputing the intermediate and output threshold values and intermediate and output weight vectors until the network output values differ by less than the predetermined minimum threshold from the corresponding goal vectors.

6. A system as defined in claim 1, in which the input means includes pattern resolution means for representing an input pattern, each input pattern representing one of the input data groups, as the sequence of N numerical values.

7. A system as defined in claim 1, in which the input means includes means for inputting N input variable values and data compilation means for combining said N input variable values into one of the input data groups.

8. A system as defined in claim 1, in which:
   a) the intermediate layer storage means includes intermediate storage units for each of a plurality of intermediate storage layers;
   b) said plurality of intermediate storage layers includes the lowest intermediate layer and higher layers connected by the connection means between the lowest layer and the output layer storage means; and
   c) each intermediate memory unit has a corresponding intermediate weight vector and intermediate threshold value.

9. A system as defined in claim 8, in which the processor and control means is further provided for projecting the weight vectors in predetermined ones of the intermediate layers by augmenting these weight vectors with at least one projection value, and for normalizing these weight vectors.

10. A data processing method including the steps:
a) in an input processor, converting each of a series of input data groups into a sequence of N numerical values to form a corresponding N-dimensional base input vector and storing each N-dimensional base input vector in an input memory device;
b) in a projection unit, augmenting each N-dimensional base input vector with j projection elements to form a projected input vector having N+j projected input elements, where j is a predetermined positive integer, and storing each projected input vector in projection memory device;
c) in a normalization circuit, normalizing the elements of the projected input vector so that the magnitude of the projected input vector is equal to a predetermined input normalization value, and storing each resulting normalized projection input vector in a normalization projection memory device;
d) in at least one intermediate node processor, for each of a plurality of intermediate nodes in a lowest intermediate layer:
   i) forming a weight vector having N+j weight elements;
   ii) constraining the magnitude of the weight vector to be equal to a predetermined weight normalization value; and
   iii) forming an intermediate nodal value as a weighted sum of the N+j input projection elements;
   iv) storing the weighted sum in a weighted sum memory device; and
e) forming an output node value as a predetermined weight function of the intermediate nodal values, and storing the output node value in an output node memory device.

11. A method as defined in claim 10, in which:
the input vectors are 2-dimensional, representing vectors in a plane;
the projected input vectors are 3-dimensional and represent vectors extending from the center of a sphere to the surface of the sphere; and
the closed decision groups each correspond to closed regions on the surface of the sphere.

12. A method as defined in claim 10, in which $j=1$.

13. A system as defined in claim 10, in which the weight normalization value is equal to the input normalization value.

14. A method as defined in claim 13, in which the weight normalization value and input normalization value are constants.

15. A method as defined in claim 11, further including the following steps:
a) selecting a training set of known training vectors and a corresponding set of known goal vectors;
b) generating an initial set of the N+j-dimensional weight vectors;
c) for each intermediate node, selecting an initial intermediate threshold value;
d) sequentially setting the base input vector equal to the training vectors;
e) in a plurality of processors, computing an error function value as a predetermined error function of the projected input training vectors, each of the weight vectors, and each of the threshold values; and
f) in a plurality processors, adjusting the threshold values and the weight elements of each weight vector and repeating steps d) and e) until the error function value is less than a predetermined minimum error value.

16. A method as defined in claim 15, in which the threshold values and the weight vectors are adjusted in a plurality of processor as follows:
for each set of threshold values and weight vectors for which the error function exceeds the minimum error value, optimizing the threshold values and weight vectors according to the following steps:
a) recomputing the threshold values and weight vectors according to a predetermined minimization routine;
b) adjusting the recomputed weight vectors so that the magnitude of each weight vector is equal to the predetermined weight normalization value; and
c) sequentially reapplying the projected input training vectors as the projected input vectors.

17. A method as defined in claim 15, in which the initial weight vectors are set equal to predetermined N+j-dimensional prototype vectors, whereby each prototype vector corresponds to a respective one of the known training vectors.

18. A method as defined in claim 10, in which the input data groups consist of input patterns in a plurality of classes, further including the step of providing an output signal for each class corresponding to a probability that a current input pattern is in the corresponding class;
whereby,
increasing the complexity of the input vectors from dimension N to dimension at least N+j and normalizing both the weight vectors and the input vectors defines closed decision groups of possible output values using a single N+j-dimensional boundary region for each decision group.

19. A method as defined in claim 18, further including the following steps:
a) separating the weight vectors into pattern weight groups, with each pattern weight group corresponding to one of the input patterns; and
b) separately optimizing each pattern weight group.

20. A method as defined in claim 18, in which each decision boundary is a hyperplane when the corresponding intermediate threshold value is given an extreme value, and a hypersphere when the corresponding intermediate threshold value differs from the extreme value.

21. A method as defined in claim 10, in which the input data groups consist of sets of N input signals, corresponding to N input variables defining a K-dimensional output function, further including the step of providing at least K output nodal values for representing a current value of the output function;
whereby,
increasing the complexity of the input vectors from dimension N to dimension at least N+j and normalizing both the weight vectors and the input vectors defines closed decision groups of possible output values using a single at least N+j dimensional boundary region for each decision group.

22. A method as defined in claim 10, further including the step of providing a plurality of intermediate layers, including the lowest intermediate layer and an uppermost intermediate layer, each having a plurality of intermediate nodes, each intermediate node having a corresponding intermediate nodal value, a corresponding intermediate weight vector and a corresponding intermediate threshold value.

23. A system as defined in claim 10, further including the step of transforming the intermediate nodal values using a transformation function, whereby each intermediate nodal value is represented as a smoothly interpolated transformed intermediate value constrained to lie between a finite maximum value and a finite minimum value.

24. A system as defined in claim 23, further including the step of computing an output weight vector for each output node, and for determining the value of each output node as a predetermined function of the weighted and biassed sums of the uppermost intermediate nodal values.

25. A method as defined in claim 10, in which the steps of the method are performed utilizing the input processing circuit, projection unit, normalization circuit, and intermediate node processor which are included in a single processing unit.

26. A method as defined in claim 10, in which the steps of the method are performed utilizing the input memory device, projection memory device, normalized projection memory device, weighted sum memory device, and output node memory device which are included in a single memory unit.

27. A method for identifying and classifying patterns, including the following steps:
   a) in an input processing circuit, representing each of a series of input data groups as a sequence of N numerical values to form a corresponding N-dimensional base input vector, each input data group consisting of input patterns in a plurality of classes, and each N-dimensional base input vector stored in an input memory device;
   b) in a projection unit, augmenting each N-dimensional base input vector with j projection elements to form a projected input vector having N+j projected input elements, where j is a predetermined positive integer, and storing each projected input vector in a projection memory device;
   c) in a normalization circuit, normalizing the elements of the projected input vector so that the magnitude of the projected input vector is equal to a predetermined normalization value, and storing each resulting normalized projection input vector in a normalized projection memory unit;
   d) for each of a plurality of intermediate nodes:
      i) forming a weight vector having N+j weight elements and storing them in a plurality of weight vector memory units;
      ii) constraining the magnitude of the weight vector to be equal to the normalization value;
      iii) forming an intermediate nodal value as a weighted sum of the N+j input projection elements;
      iv) storing the weighted sum in a weighted sum memory device;
   e) forming an output node value as a predetermined weight function of the intermediate nodal values, and storing the output node value in an output node memory device, and further including the step of providing an output signal for each class corresponding to a probability that a current input pattern is in the corresponding class;
   further including, in a training mode, the following steps:
      f) selecting a training set of known training vectors and a corresponding set of known goal vectors;
      g) in a weight vector processing circuit, generating an initial set of the N+j-dimensional weight vectors;
      h) for each intermediate node, selecting an initial intermediate threshold value;
      i) sequentially setting the base input vector equal to the training vectors;
      j) in an error function processing circuit, computing an error function value as a predetermined error function of the projected input training vectors, each of the weight vectors, and each of the threshold values; and
      k) adjusting the intermediate threshold values and the weight elements of each weight vector as follows, and thereafter repeating steps I) and J) until the error function value is less than a predetermined minimum error value:
   in an optimization processing unit, for each set of intermediate threshold values and weight vectors for which the error function exceeds the minimum error value, optimizing the intermediate threshold values and weight vectors according to the following steps:
      i) recomputing the intermediate threshold values and weight vectors according to a predetermined minimization routine;
      ii) adjusting the recomputed weight vectors so that the magnitude of each weight vector is equal to the normalization value; and
      iii) sequentially reapplying the projected input training vectors as the projected input vectors;
   whereby,
   increasing the complexity of the input vectors from dimension N to dimension N+j and normalizing both the weight vectors and the input vectors defines a plurality of closed decision groups of possible output values using a single N+j dimensional boundary region for each decision group.

28. A method as defined in claim 27, in which the initial weight vectors are set equal to predetermined N+j-dimensional prototype vectors, whereby each prototype vector corresponds to a respective one of the known training vectors.

29. A method as defined in claim 27, further including the following steps:
   a) separating the weight vectors and thresholds into pattern weight/threshold groups, with each pattern weight/threshold group corresponding to one of the input pattern classes; and
   b) separately optimizing each pattern weight/threshold group.

30. A method as defined in claim 27, in which the steps of the method are performed utilizing the input processing circuit, projection unit, normalization circuit, intermediate node processor, weight vector processing circuit, error function processing circuit, and optimization processing unit which are included in a single processing unit.

31. A method as defined in claim 27, in which the steps of the method are performed utilizing the input memory device, projection memory device, normalized projection memory device, weight vector memory units, weighted sum memory device, and output node memory device which are included in a single processing unit.

32. A data processing method including the steps:
a) in an input processor, converting each of a series of input data groups into a sequence of N numerical values to form a corresponding N-dimensional base input vector and storing each N-dimensional base input vector in an input memory device;
b) in a projection unit, augmenting each N-dimensional base input vector with j projection elements to form a projected input vector having N+j projected input element, where j is a predetermined positive integer, and storing each projected input vector in projection memory device;
c) in a normalization circuit, normalizing the elements of the projected input vector so that the magnitude of the projected input vector is equal to a predetermined input normalization value, and storing each resulting normalized projection input vector in a normalization projection memory device;
d) in at least one intermediate node processor, for each of a plurality of intermediate nodes in a lowest intermediate layer, chosen among a plurality of sequential, intermediate nodal layers;
  i) forming a weight vector having N+j weight elements;
  ii) constraining the magnitude of the weight vector to be equal to a predetermined weight normalization value; and
  iii) forming an intermediate nodal value as a weighted sum of the N+j input projection elements;
  iv) storing the weighted sum in a weighted sum memory device;
e) for each of the plurality of intermediate nodes in each of the plurality of sequential, intermediate nodal layers other than the lowest intermediate nodal layer;
  i) forming a threshold value and forming a weight vector having at least N+p weight elements, where p is the number of nodes in the immediately preceding lower intermediate nodal layer; and
  ii) forming an intermediate nodal output value as a weighted sum of the intermediate nodal values of the preceding, lower nodal layer;
f) for each intermediate nodal layer pre-chosen as a projection layer, constraining the magnitude of the corresponding weight vectors to be equal to a predetermined corresponding weight normalization value; and
g) for each output node in an output layer, forming an output weight vector and forming an output node value as a predetermined weight function of the intermediate nodal values, and storing the output node value in an output node.

33. A method as defined in claim 32, in which j=1.

34. A system as defined in claim 32, in which the weight normalization value is equal to the input normalization value.

35. A method as defined in claim 34, in which the weight normalization value and input normalization value are constants.

36. A method as defined in claim 32, further including the following steps:

a) selecting a training set of known training vectors and a corresponding set of known goal vectors;
b) generating an initial set of weight vectors;
c) for each intermediate node, selecting an initial intermediate threshold value;
d) sequentially setting the base input vector equal to the training vectors;
e) computing an error function value as a predetermined error function of the projected input training vectors, each of the weight vectors, and each of the threshold values; and
f) adjusting the threshold values and the weight elements of each weight vector and repeating steps d) and
e) until the error function value is less than a predetermined minimum error value.

37. A method as defined in claim 36, in which the threshold values and the weight vectors are adjusted as follows:
for each set of threshold values and weight vectors for which set the error function exceeds the minimum error value, optimizing the threshold values and weight vectors according to the following steps:
  i) recomputing the threshold values and weight vectors according to a predetermined minimization routine;
  ii) adjusting the recomputed weight vectors so that the magnitude of each weight vector is equal to the predetermined weight normalization value; and
  iii) sequentially reapplying the projected input training vectors as the projected input vectors.

38. A method as defined in claim 36, in which the initial weight vectors are set equal to predetermined prototype vectors, whereby each prototype vector corresponds to a sampling based on the known training vectors.

39. A method as defined in claim 32, in which the input data groups consist of input patterns in a plurality of classes, further including the step of providing an output signal for each class corresponding to a probability that a current input pattern is in the corresponding class;
whereby,
increasing the complexity of the input vectors from dimension N to dimension at least N+j and normalizing both the weight vectors and the input vectors defines closed decision groups of possible output values using a single N+j-dimensional boundary region for each decision group.

40. A method as defined in claim 35, further including the following steps:
a) separating the weight vectors and thresholds into pattern weight/threshold groups, with each pattern weight/threshold group corresponding to one of the input pattern classes; and
b) separately optimizing each pattern weight group.

41. A method as defined in claim 39, in which each decision boundary is a hyperplane when the corresponding intermediate threshold value is set to a hyperplane value, and a hypersphere when the corresponding intermediate threshold value differs from the hyperplane value.

42. A method as defined in claim 32, in which the input data groups consist of sets of input signals, corresponding to N input variables defining a K-dimensional output function, further including the step of providing at least K output nodal values for representing a current value of the output function;
  whereby,
    increasing the complexity of the input vectors from dimension N to dimension at least N+j and normalizing both the weight vectors and the input vectors defines closed decision groups of possible output values using a single at least N+j dimensional boundary region for each decision group.

43. A system as defined in claim 32, further including the step of transforming the intermediate nodal values using a transformation function, whereby each intermediate nodal value is represented as a smoothly interpolated transformed intermediate value constrained to lie between a finite maximum value and a finite minimum value.

44. A method as defined in claim 36, in which the steps of the method are performed utilizing the input processing circuit, projection unit, normalization circuit, and intermediate node processor which are included in a single processing unit.

45. A method as defined in claim 36, in which the steps of the method are performed utilizing the input memory device, projection memory device, normalized projection memory device, weighted sum memory device, and output node memory unit which are included in a single memory unit.

46. A data processing system comprising:
  a) input means for representing each of a series of input data groups as a sequence of N numerical values to form a corresponding N-dimensional base input vector;
  b) memory means;
  c) means for storing N+j projected inputs;
  d) neural network means including:
    i) input layer storage means, intermediate layer storage means and output layer storage means;
    ii) said input layer storage means comprising at least N+j projected input memory units, where j is a predetermined positive integer, for storing a normalized projected input vector having N+j numerical elements, with each projected input vector corresponding to one of the base input vectors;
    iii) said intermediate layer storage means comprising a plurality of intermediate memory units for storing intermediate threshold values and intermediate weight vectors;
    iv) said output layer storage means comprising a network output node for storing a network output value;
    v) connection means for connecting each projected input memory unit with predetermined ones of the intermediate memory units and for connecting the output node with predetermined ones of intermediate memory units;
  e) processor and control means
    i) for augmenting each N-dimensional base input vector with j projection elements to form said projected input vector;
    ii) for computing an intermediate threshold value and an intermediate weight vector, with each weight vector having N+j weight elements for each intermediate memory unit in a lowest intermediate layer; and
    iii) for computing an output value as a predetermined function of the intermediate weight vectors, the intermediate threshold values and the projected input vectors;
  f) connection means for connecting said processor and control means to (i) said input means, (ii) said digital memory means, and, (iii) said neural network means.

* * * * *